US008473098B2

(12) United States Patent
Lock et al.

(10) Patent No.: US 8,473,098 B2
(45) Date of Patent: Jun. 25, 2013

(54) APPARATUS FOR DISPENSING AND/OR VENDING A BULK PRODUCT

(75) Inventors: Christopher Roy Lock, Calgary (CA); Andras Gyorffy, Calgary (CA); Graham Russell Nelson, Olds (CA)

(73) Assignee: 646840 Alberta Ltd., Calgary (CA)

( * ) Notice: Subject to any disclaimer, the term of this patent is extended or adjusted under 35 U.S.C. 154(b) by 667 days.

(21) Appl. No.: 12/126,412

(22) Filed: May 23, 2008

(65) Prior Publication Data

US 2008/0290107 A1 Nov. 27, 2008

Related U.S. Application Data

(60) Provisional application No. 60/939,701, filed on May 23, 2007.

(51) Int. Cl.
*G06F 17/00* (2006.01)

(52) U.S. Cl.
USPC ............ 700/241; 700/239; 700/240; 700/242

(58) Field of Classification Search
USPC .......................................... 700/232, 239, 240
See application file for complete search history.

(56) References Cited

U.S. PATENT DOCUMENTS

| | | | | | |
|---|---|---|---|---|---|
| 3,932,978 | A * | 1/1976 | Kinney | ........................... | 53/471 |
| 5,551,604 | A | 9/1996 | Kern et al. | | |
| 5,685,435 | A | 11/1997 | Picioccio et al. | | |
| 5,709,063 | A * | 1/1998 | Yuyama et al. | ................. | 53/154 |
| 5,997,236 | A * | 12/1999 | Picioccio et al. | ............. | 221/197 |
| 6,351,688 | B1 * | 2/2002 | Nichols et al. | ................ | 700/241 |
| 6,471,090 | B1 * | 10/2002 | Inamura et al. | ............... | 221/124 |
| 7,080,755 | B2 * | 7/2006 | Handfield et al. | ............ | 700/237 |
| 2003/0057234 | A1 | 3/2003 | Vales | | |
| 2004/0114557 | A1 | 6/2004 | Bryan et al. | | |

FOREIGN PATENT DOCUMENTS

| | | | |
|---|---|---|---|
| CA | 2632351 | A1 | 11/2008 |
| WO | W096/18980 | | 6/1996 |

OTHER PUBLICATIONS

Best Bins, Oct. 2006, pp. 1-3, online: http://web.archive.org/web/20061019160356/www.bestbins.com/ products.htm.

POP Displays for Sale, Point of Purchase Display Racks & Stands, Retail Displays, Trade . . . ; Sep. 2006, pp. 1-3; online: http://web.archive.org/web/20060905063514/http://www.displays2go.com/index.html.

Trade Fixtures, Sep. 2006, p. 1, online: http://web.archive.org/web/20060901052545/http://www.tradefixtures.com/.

Trade Fixtures, Products, Sep. 2006, pp. 1-2, online: http://web.archive.org/web/20060901051602/www.tradefixtures.com/products/htm.

* cited by examiner

*Primary Examiner* — Timothy Waggoner
(74) *Attorney, Agent, or Firm* — Bennett Jones LLP

(57) ABSTRACT

An apparatus for dispensing and/or vending a bulk product. The apparatus comprises one or more bins for holding a bulk product, a dispensing mechanism operatively coupled to each of the bins, a controller operatively coupled to the dispensing mechanisms, and an interface for receiving a request for one of the bulk products. The controller is operatively coupled to the interface and configured to generate one or more control signals in response to a request for controlling the dispensing mechanism to dispense one of the bulk products.

22 Claims, 17 Drawing Sheets

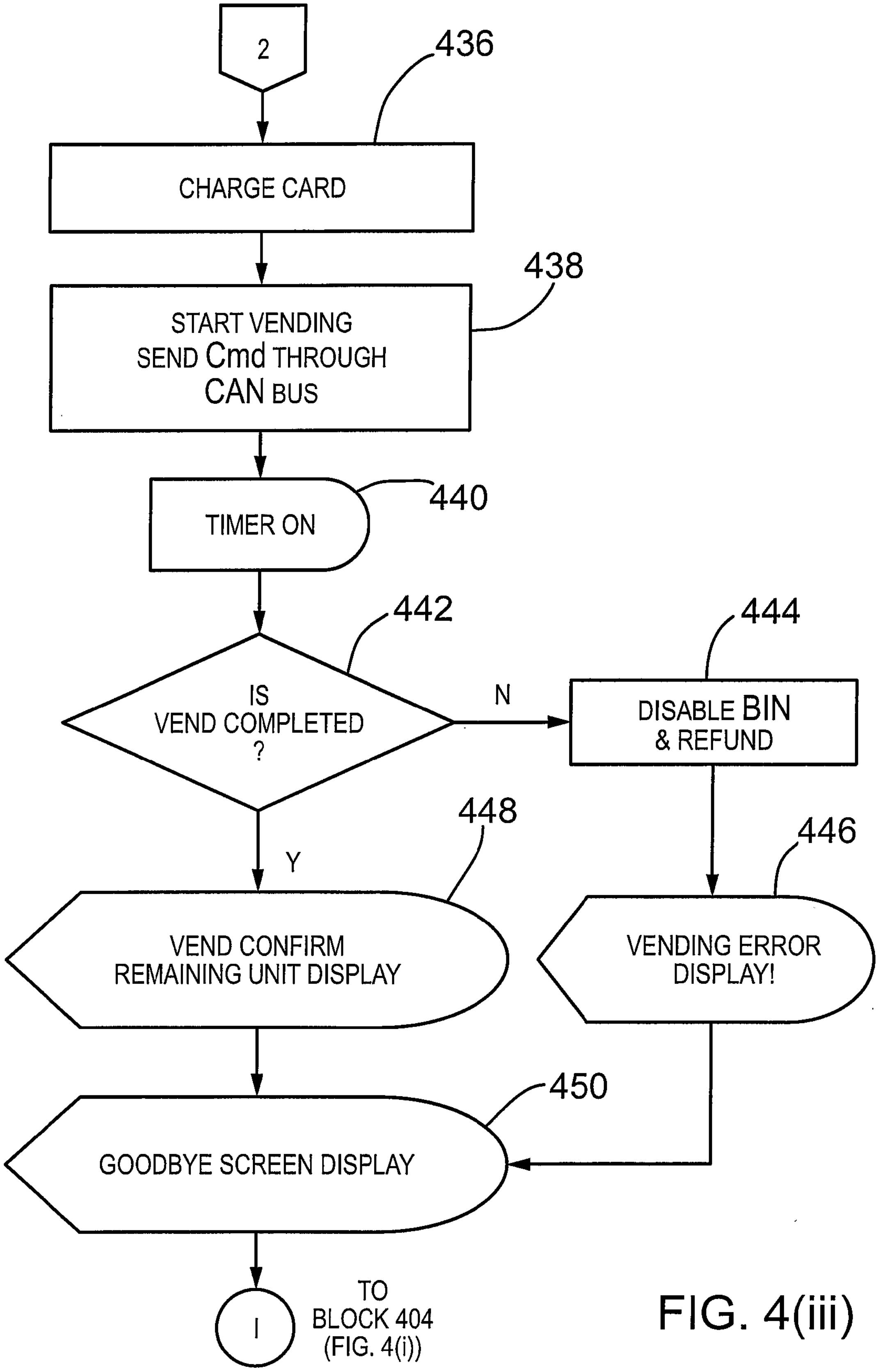
FIG. 4(iii)

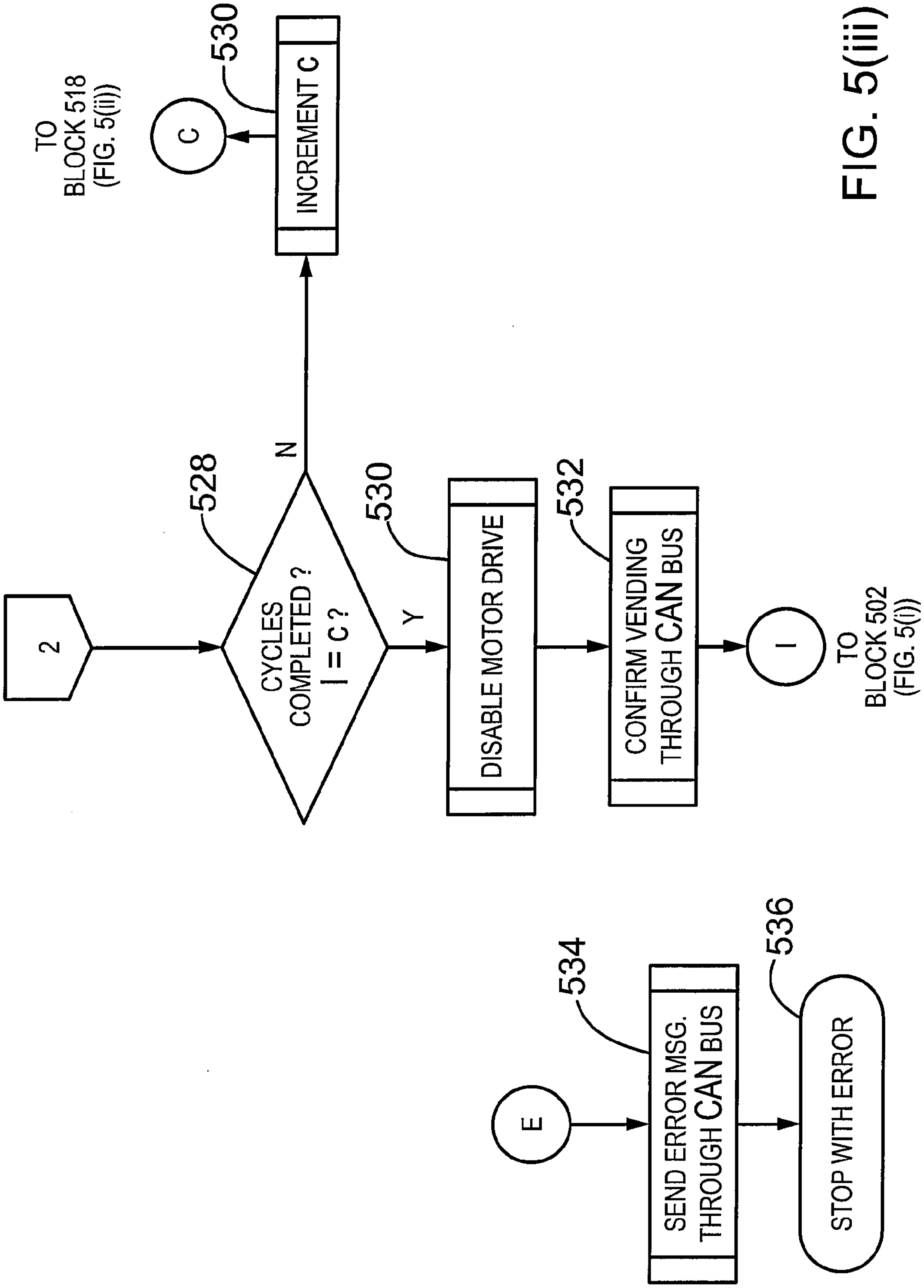
FIG. 5(iii)

APPARATUS FOR DISPENSING AND/OR VENDING A BULK PRODUCT

FIELD OF THE INVENTION

The present invention relates to vending and dispensing equipment, and more particularly, to vending/dispensing apparatus for bulk products where the quantity of the product to be dispensed is specified by a customer at the time of purchase or selection.

BACKGROUND OF THE INVENTION

Purchasing products in bulk form has become an acceptable type of purchase by consumers. This is evidenced by the range of bulk products offered for sale in a variety of settings, such as for example, grocery stores, coffee stores, pet food stores and candy stores.

Bulk purchases of a product are made either by weighing the product, which is taken from a storage bin, or by buying a package containing a predetermined amount of bulk product, in food stores or the bulk food section of grocery stores. The purchase is completed with a cashier using a cash register. It will be appreciated that this limits the locations and times when a product can be purchased in bulk, which in turn can present a convenience obstacle for the consumer.

In the case of candy manufacturers, when a product is sold in pre-packaged form labeled with the manufacturer's brand, it is distributed by the manufacturer mainly through point-of-sale outlets. Many candy manufacturers can also supply product in bulk, but are typically limited to selling predetermined quantities of bulk product because of distribution and packaging considerations. For example, candies can be purchased three different ways: in pre-packaged form under the manufacturer label, in bulk form from a vending machine, or in bulk form from an open bin in a grocery store or bulk food store.

In many cases the bulk bins used to store the products offered are susceptible to contamination, shrinkage and spilling, which can be further exacerbated by consumers reaching into the bin with their hands to gather or sample the product before purchase. It is conceivable that the vendor may be put at risk or incur liability. Furthermore, even where recently available bulk gravity bins have been implemented to ensure sanitation, the dispensing mechanisms are not able to dispense products in measured quantities.

Where dry bulk products are acquired in larger quantities there is typically a need to employ staff to measure, weigh, determine a final or sale price and collect money from the customer. The overhead cost associated with supplying the equipment and employing staff is significantly more than if the acquisition process was an unmanned automated process.

In most cases where bulk products are sold, the customer must "guess" the weight and the corresponding cost of the purchase which may or may not be close to the weight the customer actually desires or the amount of money the customers actually wants to spend on the purchase. Even in cases where weigh scales are available in the store, the customer must perform the iterative task of dispensing, weighing, adding or removing product, re-weighing, etc. until the desired amount of product or cost is determined.

In the case where products are sold through automated bulk vending equipment, the vendor is limited to selling product using a fixed price and a smaller, fixed vend quantity. The customer typically inserts a coin (token or paper currency) and a fixed quantity is dispensed. Currently available automated equipment therefore does not allow the customer to specify the amount of product desired, e.g. based on weight, product count or value. In addition, automated vending equipment is limited to dispensing only uniform products that are hard-coated and not subject to "sticking" together because of warm or humid conditions.

In summary, the sale of bulk foods tends to be costly, restrictive and not customer friendly in large part due to limitations of known bulk storage and dispensing technology. Accordingly, there remains a need for improvements in the art.

BRIEF SUMMARY OF THE INVENTION

The present invention comprises a system and a method for dispensing and/or vending a product stored in bulk, wherein the quantity of the product is specified or determined by a consumer according to weight and/or dollar value. According to another aspect, the consumer is provided with both cash or cashless payment options for purchasing the desired quantity or volume of the product.

According to one aspect, there is provided an apparatus for dispensing and/or vending a bulk product, wherein the quantity of the product being dispensed and/or purchased is specified by a user or consumer in weight and/or dollar value.

According to another aspect, there is provided a process for dispensing and/or vending an exact or an approximate quantity of a bulk product, wherein the process is controlled by a user or consumer, and the exact or approximate quantity of bulk product is specified by the consumer. According to another aspect, the specified quantity of the product is purchased by the consumer without the need for intervention and/or instruction from a sales person or clerk.

According to another aspect, there is provided a system for dispensing a bulk product, the system comprises: one or more bins, each for holding a bulk product; an interface for receiving a user request for one of the bulk products; a controller for dispensing the requested bulk product from the associated bin in an amount based on the user request.

According to another aspect, there is provided a method for dispensing bulk products from one or more bins, the method comprises the steps of: receiving a bulk product selection from a user; receiving a bulk product dispensing amount from the user; enabling the bin containing the selected bulk product; and dispensing the selected bulk product from the enabled bin in the amount specified by the user.

According to another aspect, there is provided a system for dispensing a bulk product, the system comprises: a controller, the controller includes a user interface; one or more bins, each for holding a type of bulk product, and each of the bins including a control unit; a communication bus for communicatively coupling the controller with the control units of each of the bins; the controller being responsive to an input from a user and generating one or more control commands for dispensing an amount of bulk product from one of the bins, wherein the dispensed amount is based on the user input.

According to another aspect, there is provided an apparatus for dispensing one or more bulk products, the bulk products being contained in one or more bins, each of the bins including a dispensing mechanism and the dispensing mechanism being operatively coupled to a controller, the apparatus comprises: an interface configured for receiving a user request for one of the bulk products and generating one or more signals representative of the user request; a control unit operatively coupled to the interface for receiving the one or more representative signals, and the control unit being configured for generating one or more controls signals based on the one or more representative signals; the control unit including an interface for operatively coupling to the one or more controllers and being configured for sending one or more control signals to one or more of the controllers; and the one or more controllers being responsive to the one or more control signals to dispense the bulk product from the bin based on the user request.

According to another aspect, there is provided a bin for holding a bulk product and suitable for use with a dispensing apparatus, the bin comprises: a housing; a primary baffle for supporting the bulk product, the primary baffle being mounted inside the housing, the primary baffle being configured at a downwardly sloping angle, and having an opening at a lower portion; a secondary baffle mounted inside the housing, the secondary baffle being configured at a downwardly sloping angle and adjacent to the opening; and a lower compartment adjacent the secondary baffle, the lower compartment having an opening for releasing bulk product from the secondary baffle to a dispensing mechanism.

According to another aspect, there is provided a dispensing wheel for use with a bulk product dispensing apparatus, the dispensing wheel comprises: an outer rim; a longitudinal member across the rim and including a hub; the outer rim having a plurality of slots for receiving one end of a partition member; and the hub having a plurality of slots for receiving another end of the partition member.

According to another aspect, there is provided a container dropper suitable for use with a bulk product dispensing apparatus, the container dropper comprises: a first member having an opening for receiving one or more containers; a second member supporting at least one auger component positioned adjacent to the opening; the at least one auger component including a threaded portion for engaging the one or more containers; and a motor operatively coupled to the at least one auger, and the motor being configured for turning the auger in response to one or more container dropper control signals.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional and other features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Reference will now be made to the accompanying drawings which show, by way of example, embodiments of the present invention, and in which.

DETAILED DESCRIPTION OF THE EMBODIMENTS

Figure 1:
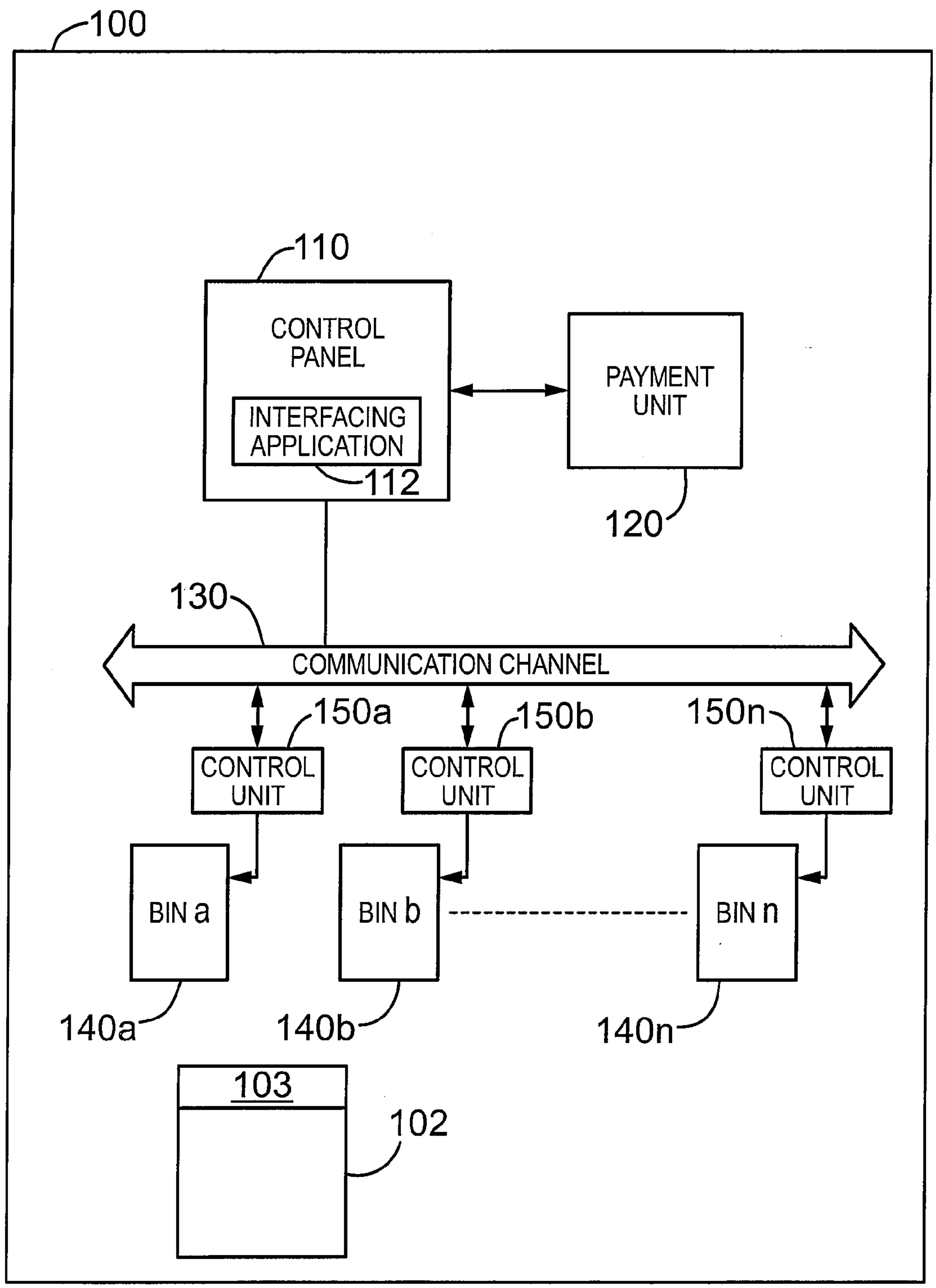
FIG. 1 shows in diagrammatic form a dispensing apparatus according to an embodiment of the present invention.

Reference is first made to FIG. 1, which shows a vending and dispensing apparatus according to an embodiment of the present invention, and indicated generally by reference 100. As shown, the dispensing and vending apparatus 100 comprises a control panel 110, a payment unit 120, a two-way communication channel or bus 130, and one or more bins 140. The bins 140 are indicated individually by 140*a*, 140*b*, . . . 140*n*. As shown, each of the bins 140 includes an associated controller or control unit 150, indicated individually by reference 150*a*, 150*b*, . . . 150*n* in FIG. 1. The bins 140 store product and the number of bins 140 used in an implementation of the apparatus 100 will depend on factors such as the types and number of the products being offered, the size of the apparatus 100, etc. According to one implementation, the control panel 110 and communication bus 130 provides a control/command interface for coupling 128 of the bins 140. The control unit 150 functions with the associated bin 140 to dispense an exact or an approximate amount or quantity of product specified in weight, product count and/or dollar value by the consumer as will be described in more detail below. According to an embodiment, the apparatus 100 includes a carton dispenser which is responsive to control commands for dispensing a carton or box 102 as described in more detail below.

The control panel 110 is utilized by a user, e.g. a consumer, shopper, customer, etc., to select the product and specify an exact or an approximate quantity of the product, and then purchase, dispense or otherwise acquire the product, as will be described in more detail below. The control panel 110 comprises a main or central controller, a keypad and a display module, or a display module with a touch-screen. In another embodiment, the control panel 110 is implemented in the form of a voice-activated device and a display device. The control panel 110 is responsive to inputs from a customer and generates output data or signals for an interfacing application 112. The interfacing application 112 responds to the inputs from the customer and operates the apparatus 100 to dispense or vend the product as will be described in more detail below. The interfacing application 112 is implemented in software and comprises, for example, a stand-alone computer program or software module or firmware application or function, which is executed by the controller to control the interaction between the customer and the apparatus. The functions of the controller and the interfacing application are described in more detail below and with reference to FIG. 4. The interfacing application 112 may reside on a device or hardware component that is integrated with the control panel 110, for example, as shown in FIG. 1. In another embodiment, the interfacing device 110 comprises a separate device that "talks" or is coupled to the control panel 110 via the communication channel 130.

It will be appreciated that the apparatus 100 according to an embodiment of the present invention can be implemented or function in two ways or modes: vending mode and dispensing mode. In vending mode, the apparatus 100 is implemented as a vending apparatus 100 wherein a user selects a product and specifies a quantity (i.e. exactly or approximately by weight and/or dollar value) of the product desired for purchase, and the apparatus 100 dispenses the specified quantity of the product upon receiving payment. The vending implementation of the apparatus 100 is suitable for commercial applications, such as, grocery stores, bulk food stores, vending kiosks, etc. In dispensing mode, the apparatus 100 is implemented as a dispensing apparatus wherein the apparatus 100 dispenses the specified quantity of the product selected by the user without requiring payment. The dispensing implementation of the apparatus 100 is suitable for non-commercial applications, for example, a private club, a daycare, etc. According to an embodiment, the apparatus 100 is convertible to a dispensing apparatus by disabling the payment unit 120 and/or the payment function or module in the interfacing application 112.

In the context of a vending application or implementation, once a user has selected the product and quantity desired, the apparatus prompts the user to pay for the purchase using the payment unit 120. The interfacing application 112 includes a function or module to calculate the cost of the product purchase and the purchase price is displayed for the user on control panel 110. The user pays the purchase price using the payment unit 120, and the payment unit 120 is implemented to accept as payment in multiple forms, such as, coins or bills, tokens, smart cards, credit or debit cards, or any combination of these. The tokens may be purchased from a third-party or from a token dispenser (not shown) associated with the vending apparatus 100. According to one embodiment, the payment unit 120 is integrated with the control panel 110. In another embodiment, the payment unit 120 comprises a separate device that is communicatively coupled with the control panel 110.

Once the correct payment is received by the payment unit 120, the dispensing of the selected product and the specified quantity begins. The control panel 110 sends control information, for example, one or more signals via the communication channel 130, to the control unit 150 associated with the bin 140 that contains the product selected by the user. As an example, assume that the user selects a quantity of product contained in bin 140*a*. The control panel 110 sends a signal to the local control unit 150*a* for the bin 140*a* to begin the dispensing process. According to an embodiment, the control unit 150 is implemented as an intelligent device that runs or executes a dispensing application or program (e.g. implemented in software and/or firmware), which functions to dispense the specified quantity of the selected product into a container 102 (e.g. a box, a carton or a bag) for retrieval by the user. According to an embodiment of the present invention, the container 102 includes an advertising or promotional panel or section 103. The advertising panel 103 provides information related to the manufacturer of the product, the owner of the machine, and/or any other third-party who wishes to purchase advertising.

According to another aspect, the control panel 110 is configured to allow authorized personnel to gain access to the internal equipment and components of the apparatus 100 for maintenance and also to replenish product. The control panel 110 may also be configured to allow authorized personnel to program or configure operation of the apparatus 100. Authorized personnel gain access to secured features (for example, product descriptions) by entering a unique code on the control panel 110 or by scanning or swiping a security card in the smart card reader. The control panel 110 may be implemented with a second layer of security, for example, comprising entry of a password after the security card is scanned. According to another embodiment, a specific code is required to access specific features of the apparatus 100. For example, an authorized person enters a security code "XXXX" which corresponds to a configuration routine that allows the authorized person to re-configure which product is associated in which bin 140. As a further example, an authorized person may enter a security code "YYYY" which corresponds to a price adjustment routine that allows the authorized person to re-program the cost per unit of weight for some or all of the product bins 140.

According to an embodiment, the interfacing application 112 is implemented to interact with the mechanical components or modules of the apparatus 100 and to perform certain computational, encryption and error checking algorithms, for example, as described in more detail below.

Figure 2:
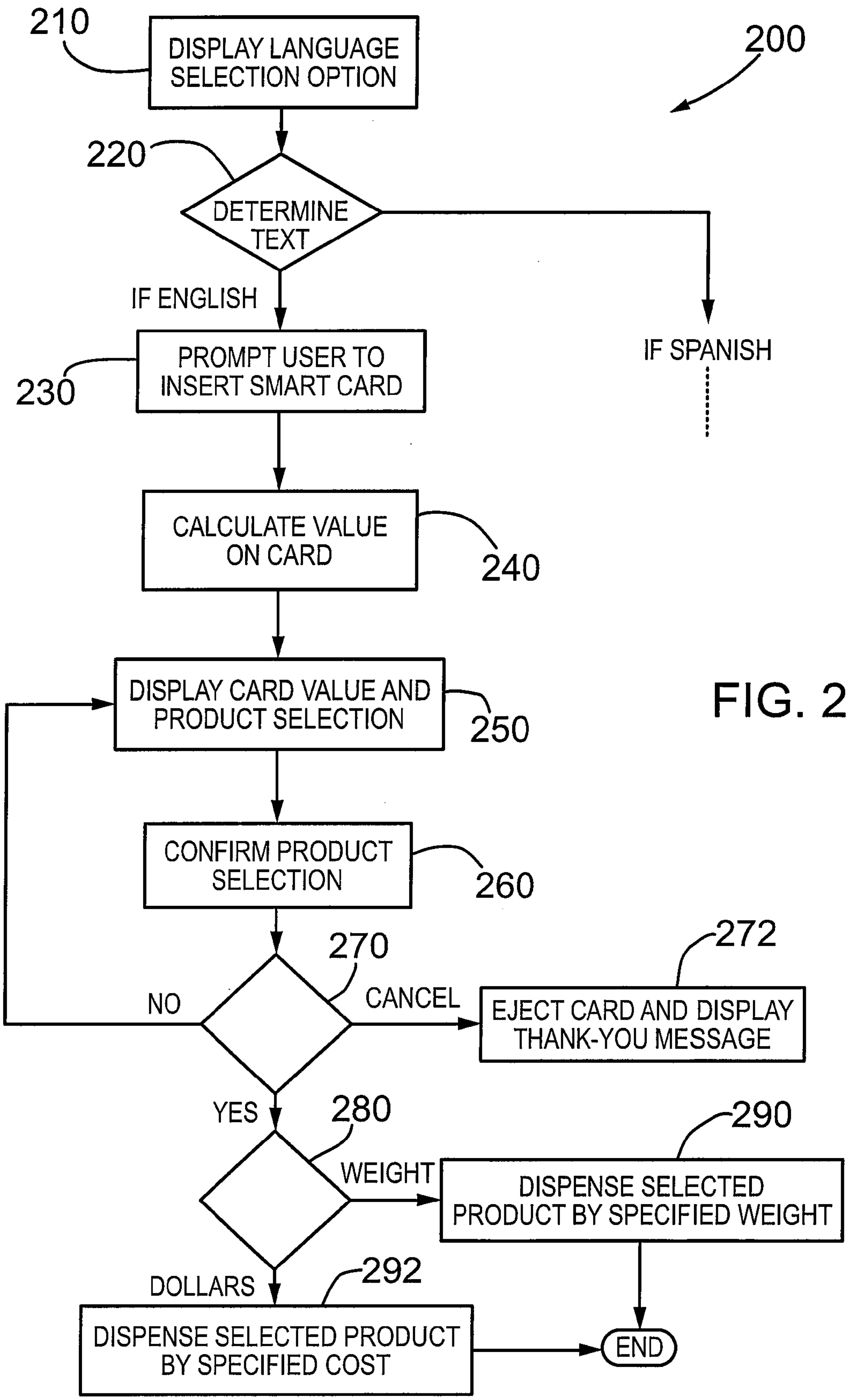
FIG. 2 shows in flowchart form an exemplary process for a customer to purchase a bulk product from a vending apparatus according to an embodiment of the present invention.

Reference is next made to FIG. 2, which shows in flowchart form a series of steps 200 performed or executed by the interfacing application 112 (FIG. 1) for a user, e.g. a customer or consumer, according to an embodiment of the present invention. The first operation indicated by step 210 comprises displaying a language selection option for the customer. Depending on the application of the apparatus 100, the language selection option may be omitted. Once the customer selects the desired language, the interfacing application determines the text for the remainder of the transaction, as indicated by step 220.

The next operation at step 230 comprises prompting the customer to enter or swipe a smart card. Other forms of payment, e.g. cash based or cashless, may be accepted as described in more detail below. In addition, this step can be executed later during the transaction. Once the card is entered, the next operation involves calculating the value remaining on the card as indicated at step 240, and optionally presenting the remaining value to the customer, for example, at step 250. As shown, step 250 comprises displaying the products available to the customer and the corresponding selection number. Step 250 may also include prompting the customer to make a selection. According to another embodiment, step 250 may also indicate the amount of product in dollars and/or weight that is remaining in each bin and/or different price points for different volumes/quantities of product. According to an embodiment, the control panel 110 includes a display module, for example, a LCD module or touch-screen, which allows the information to be displayed in a formatted fashion and/or graphical manner or form.

Once the customer selects a product to dispense, the interfacing application 112 is configured (for example, in a software/firmware function, routine, object or code component) to prompt the customer to confirm the selection at step 260. The customer is presented with the options of "yes", "no" and "cancel" as indicated by decision step 270. If the customer selects "cancel" the transaction is terminated and the smart card is ejected, as indicated by 272. If the customer selects "no" then the interfacing application proceeds back to step 250. If the customer selects "yes" then the interfacing application 112 proceeds to step 280, where the user is prompted to select the quantity of the selected product desired in either currency or weight. It will be appreciated that according to another embodiment, the customer is provided with the capability to specify the number of items or product count, for example, 10 metal washers or 15 bolts, or volume, for example, 100 grams, or dollar value, for example, $5 worth of product. Once the customer selects the specified quantity, e.g. by weight or cost in step 280, the customer is prompted to place a container 102 (FIG. 1) under the bin 140 for the selected product, or according to another embodiment the container 102 is automatically placed or dropped in place, and the interfacing application 112 issues the dispensing command(s) or signal(s) to the bin to dispense the product according to weight (as indicated by step 290) or according to cost (as indicated by step 292). According to another embodiment, the vending apparatus 100 includes a mechanism for dropping or placing a container 102 under the bin 140 holding the product selected by the customer.

The following example further illustrates operation of the vending apparatus 100 according to an embodiment of the invention. It will be appreciated that the "screen dialogue" may be customized or tailored for each and different types of operating environments or applications.

Exemplary Sequence for a Product Purchase (English)

| | |
|---|---|
| Opening Display | For: English press1: Spanish press 2. |
| Step 1 Display (English) | Welcome to the ABC bulk purchase system. Before making your bulk product selection, please purchase a customer "smart card" from the card dispenser located on the side of this fixture. If you have already purchased a smart card and there is value remaining on the card please touch the start button when you are ready to purchase. |
| Step 2 Display | Please insert your customer smart card into the card slot as noted below. |
| | (Picture is displayed to show how to insert card) |
| Machine Decision | You have $8.49 of product purchases available on this card. |
| Step 3 Display | The list of products available on this machine and the bin selection numbers are shown below. When you are ready to make a purchase, please key the product number on the keypad. |
| | tongue splashers 1 |
| | cotton candy pink 2 |
| | assorted 3 |
| | lightning bolts 4 |
| | pineapple 5 |
| | ice cream 6 |
| | Hawaiian pineapple 7 |
| | grape fruit 8 |
| | kicked lemonade 9 |
| | blueberry 10 |
| Step 4 Display | The product you have chosen is grape fruit gum, is this correct? |
| Step 5 Display | Yes or No or Cancel |
| Step 6 Display | Please indicate whether you wish to purchase your product choice by weight or dollar value by touching the # key for weight or the $ key for dollar value. |
| Step 7 Display | Please indicate the quantity of product you wish to purchase in ounces or dollar value on the keypad (or touch screen). Use the chart on the side of the keypad to convert pounds or grams into ounces. |
| Step 8 Display | Your product selection is to purchase 8 ounces of grape fruit gum. Is this correct? Touch Yes or No or Cancel on the keypad. |
| Step 11 Display | Your purchase is now ready to be dispensed. Please take a product box located on the side of the keypad and slide it underneath the product chute of the product bin you have purchased. Open the door of the product bin and the product will dispense into the box automatically. Thank you for using ABC smart card to make your product purchase. You have $xx.xx of product purchase on your smart card. Please come again. |

Figure 3:
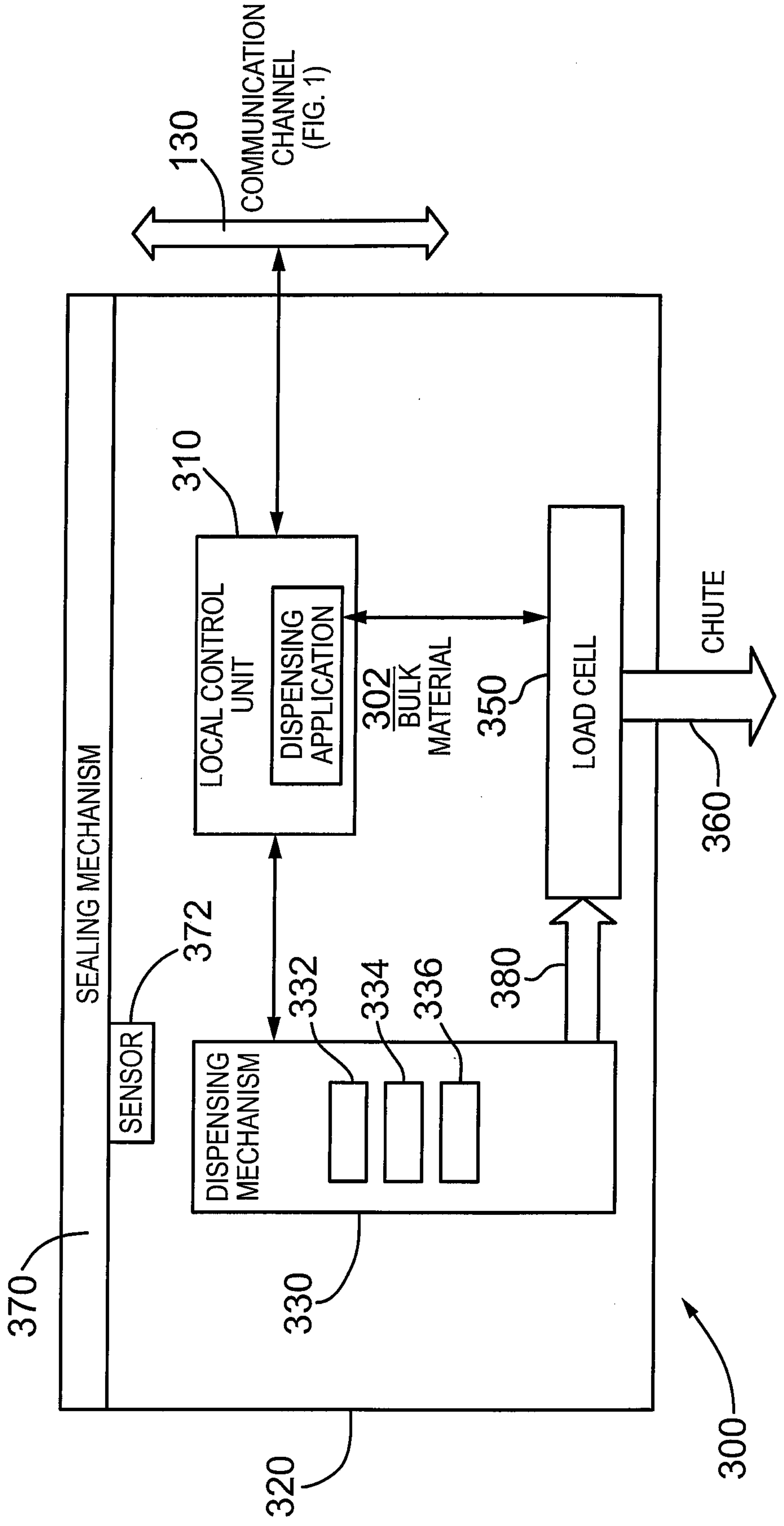
FIG. 3 shows in diagrammatic form a bin and dispensing mechanism for holding and dispensing a bulk product according to an embodiment of the present invention.

Reference is next made to FIG. 3, which shows in diagrammatic form a bin with a dispensing mechanism 300 according to an embodiment of the invention. The bin 300 contains a product indicated by reference 302. As shown, the bin 300 includes an associated control unit 310. The control unit 310 corresponds to the control unit 150 described above with reference to FIG. 1, and is communicatively coupled to the communication channel 130. The bin 300 comprises a housing 320, a dispensing mechanism 330, a guide 340, a load cell 350 and a chute 360. The housing 320 may be formed or fabricated from different materials such as metal, plastic or ceramic, and the selection of material will depend on the type of products that are to be held in the bin 300. According to an embodiment, the bin 300 includes a sealing mechanism 370 which provides a seal to prevent contamination of the bulk product 302 contained in the bin 300. According to an embodiment, the sealing mechanism 370 is secured and can only be opened by authorized personnel to replenish produce or to perform maintenance. According to an embodiment, a sensor 372 is provided to indicate if sealing mechanism 370 is properly engaged. If the sensor 372 indicates a sealing failure or breach, then interfacing application 112 prevents purchases or dispensing of product from the bin 300.

The control unit 320 is activated by a start signal sent by the interfacing application 112 (FIG. 1) in response to an input on the control panel 110 (FIG. 1). According to an embodiment, the start signal comprises a message identifying the bin associated with the product selected by the customer and including the quantity of product specified by the customer. In response, the control unit 320 runs or executes a dispensing application 322. The control unit 320 may be implemented as a microprocessor-based device operating under stored program to perform the operations and functions associated with the dispensing process as described. The specific implementation details of the control unit 320 are readily within the understanding of one skilled in the art.

According to an embodiment, the dispensing mechanism 330 comprises a motor driver 332 and a dispensing wheel 334. The dispensing mechanism 330 may include an agitation mechanism indicated by reference 336. A dispensing cycle is executed as follows: the dispensing application 322 enables the motor driver 332, sets the rotation direction toward the load cell 350 and commands the motor driver 332 to begin turning dispensing wheel 334 thus commencing the dispensing cycle. The guide 380 is provided to direct flow of the product toward load cell 350.

During the dispensing cycle, the load cell 350 is used to measure the actual quantity of product being dispensed and this measured quantity is periodically compared to the quantity requested by the customer. Once the measured quantity is the same as the requested quantity (or within a defined threshold), the dispensing application 322 reverses the rotation of the motor to stop further product being dispensed and the motor driver 332 is set to its initial position. It will be appreciated that in the case where the amount of product being dispensed is specified according to dollar value, the processing steps are similar, except the product is not weighed, but dispensed in quantities relative to a specified dollar value input by the consumer.

According to embodiment, the dispensing application 322 actuates or enables the agitation mechanism 336 during the dispensing cycle to prevent the product from sticking or clumping together. It will be appreciated that this also allows the product quantity to be more accurately measured and dispensed.

It will be appreciated that the bin and dispensing mechanism 300 may be sold or provided as a separate unit or component. For example, a proprietor of a vending machine 100 may purchase one or more additional bins 300 and connect then the vending machine 100 in order to expand the bulk product offerings. The architecture of the control panel 110 and communication bus 130 provides a control/command interface that facilitates expansion of the number of bins. In accordance with one embodiment, a single control panel 110 is configured to control 128 bins via the communication bus 130 through a control/command interface implemented in firmware and/or software. According to one implementation, the bins 140 are individually addressable/controllable via commands/status requests on the communication bus 130.

According to one embodiment, the communication bus is implemented using the CANBUS architecture. For a configuration of 128 bins 140, the control/command interface for comprises the following message structures and protocol:

1. General Message structure:
   _ID CMD DCS MSGL FV
   where: the _ID field identifies the addressed device/board (e.g. local controller for a bin) on the bus (one byte field)
   the CMD field is the command in hex format (one byte field)
   the DCS field is a Data_Carrier_Segment, and according to an embodiment comprises eight bytes as follows 0×00 0×00 0×00 0×00 0×00 0×00 0×00 0×00
   the MSGL field indicates the Length of Message (one byte field)
   the FV field comprises a Form Value of the Message (one byte field)

According to an embodiment, the ID for the central controller (i.e. the control panel 110) is 1000, and the bins (i.e. the bin control unit 150) are assigned ID's between 1 and 128. For the CANBUS implementation, the Extended CAN format is used, which provides a 29 bit Identifier.

2. Commands

Commands based on the general message include the following:

(a) Dynamic Inquiry Command for performing a dynamic inquiry of the attached bin's comprises the following form:
   BIN_ID 0×12 0×00 0×00 0×00 0×00 0×00 0×00 0×00 0×08 F_V
   where: BIN_ID field holds the value of the selected bin by the customer
   CMD field identifies the Inquiry Command, e.g. 0×12
   Data Carrier Segment field [bytes 0 . . . 7]—reserved for future use
   MSGL field indicates Data Length, e.g. 0×08
   F_V field indicates the Form Value of Message
   In operation according to an embodiment:
   The central controller sends the Inquiry Message to BIN_ID's between 1 . . . 128. The BIN_ID's are incremented, then the actual messages are sent. An attached bin replies the same message but with the central controller's ID and as a result a bin is considered attached. An attached bin's ID will be added to the "Attached BIN" structure for future use by customers.

(b) Vending Process Start Command
   BIN_ID 0×10 0×YY 0×ZZ 0×00 0×00 0×00 0×00 0×00 0×00 0×08 F_V
   where: BIN_ID field holds the value of the selected bin by the customer
   CMD field identifies the Vending Start Command, e.g. 0×10
   Data Carrier Segment[bytes 0 . . . 7]:
   —bytes [0 1] with values 0×YY and 0×ZZ—represent the number of Dollar amount translated to number of requested vends or requested weight by the customer
   —bytes [2 . . . 7] with values 0×00 are reserved for future use
   MSGL field indicates Data Length, e.g. 0×08
   F_V field indicates the Form Value of Message
   In operation according to an embodiment:
   The central controller signals the selected bin to start a vending cycle for the requested dollar amount translated in number of vends or weight.

(c) Vending Process Stop Command
   CCTRL_ID 0×11 0×00 0×00 0×00 0×00 0×00 0×00 0×00 0×00 0×08 F_V
   where: CCTRL_ID field holds the value of the central controller ID, e.g. fixed to 1000
   CMD field identifies the Vending Done Command, e.g. 0×11

Data Carrier Segment[bytes 0 . . . 7]:

—bytes [0 7] with values 0×00 are reserved for future use

MSGL field indicates Data Length, e.g. 0×08

F_V field indicates the Form Value of Message

In operation according to an embodiment:

The bin signals the central controller about the completion of a successful vending cycle.

(*d*) Vending Process Stop Command

CCTRL_ID 0×13 0×00 0×00 0×00 0×00 0×00 0×00 0×00 0×00 0×08 F_V where: CCTRL_ID holds the value of the Central Control ID fixed to 1000

CMD field identifies the Vending Done Command, e.g. 0×13

Data Carrier Segment[bytes 0 . . . 7]:

—bytes [0 7] with values 0×00 are reserved for future use

MSGL field indicates Data Length, e.g. 0×08

F_V field indicates Form Value of Message

In operation according to an embodiment:

Should an error occur during the vending cycle the bin (i.e. bin controller) sends an error to the central controller. The central controller will remove the signaling bin from the "Attached BIN" structure in order to avoid its further use until the error condition of the bin is rectified by a service person.

Figure 4I:
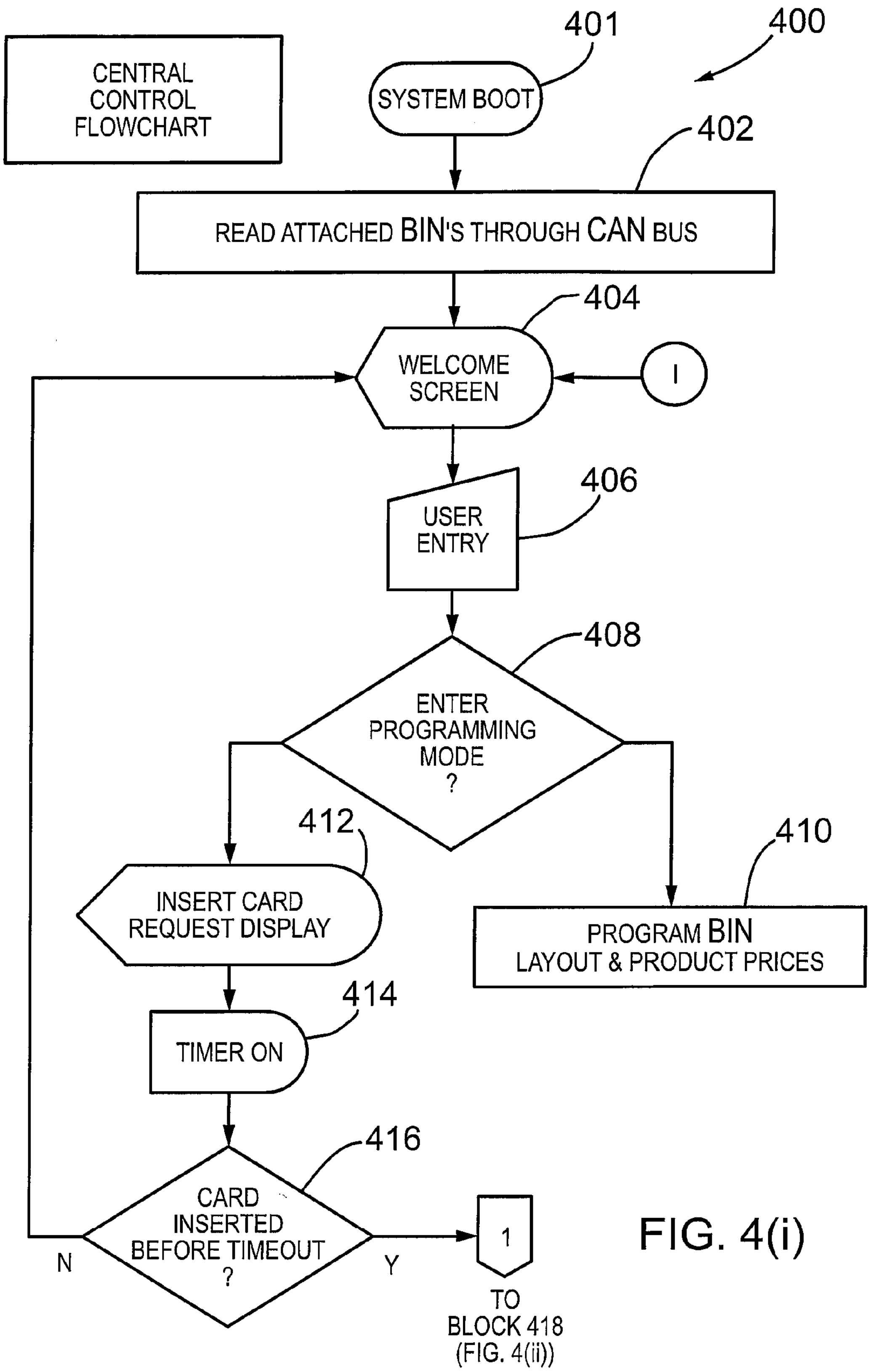
FIG. 4 shows in flowchart form an exemplary control process executed by a central controller for the vending apparatus.
Figure 4:
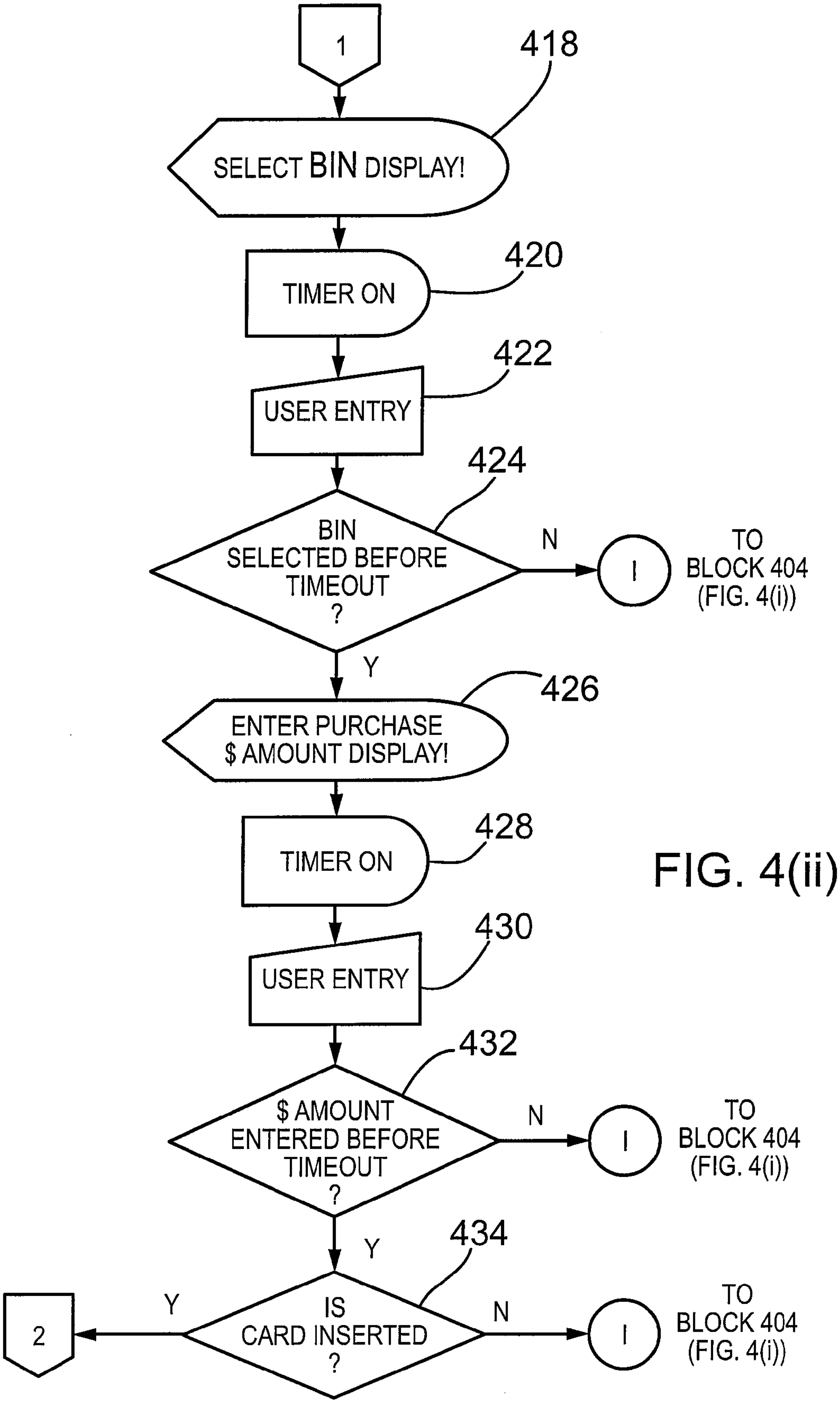

Reference is next made to FIG. 4, which shows a control process executed or performed by the control panel 110 (FIG. 1), i.e. the controller executed a computer program or firmware stored in memory, according to an embodiment of the invention and indicated generally by reference 400.

As shown in FIG. 4, in response to a system boot (e.g. power on, or hard reset) in step 401, the process proceeds to read the bins, i.e. to determine the number of bins 140 (FIG. 1) coupled to the communication bus 130 (FIG. 1), as indicated by step 402. According to one embodiment, the controller in the control panel 110 (FIG. 1) polls the bins 140 and waits for a reply from the respective control units 150 (FIG. 1). Next as indicated by step 404, the controller displays a 'welcome screen' on the display module of the control panel 110, and waits for a user entry in step 406. In response to a user entry, the controller determines if the entry is for programming or a purchase (i.e. in a commercial application) in decision step 408. If the input is a programming input, e.g. from an authorized technician, the controller executes one or more programming or setup functions as indicated generally by step 410. If the input is for a purchase, the controller displays an insert card prompt in step 412. According to an embodiment, the controller activates a timer in step 414 and a timeout is generated in step 416 if the user doesn't insert a card within a predetermined time period. If a timeout is generated, the welcome screen is displayed in step 404. Otherwise the controller displays a 'select bin' display for the user in step 418, activates a timer in step 420 and waits for a user entry in step 422. If the user does not select a bin before the timer period expires, then control returns to the welcome screen in step 404. If the user selects a bin within the predetermined time period, the controller displays an 'enter purchase $ amount' display in step 426 and activates a timer in step 428 for a user entry in step 430. If the purchase amount is not entered before the timer times out as indicated in step 432, then control returns to the welcome screen in step 404. If the purchase amount is entered in time, as determined in step 432, then a check is made in step 434 to determine if the card is inserted. If the card is not inserted, then control returns to the welcome screen in step 404. If the card (e.g. a smart card, a debit card or a credit card) is inserted, then the card is charged in step 436 and a vending command or message is sent to the control unit 150 (FIG. 1) for the selected bin 140 (FIG. 1) over the communication bus 130 (FIG. 1) as indicated in step 438. According to an embodiment, a timer is activated in step 440 for timing the vending process. If the vending process is not completed before the timer times out, as determined in step 442, then an error condition is generated. As shown, the selected bin is disabled and the purchase amount is refunded to the user in step 444 and a vending error is displayed in step 446. A 'good bye' screen may also be displayed in step 450. If the vending process is completed within the predetermined period of time, then a vending confirmation is displayed in step 448 together with the remaining units. Step 448 is followed by the 'good bye' screen in step 450, and then the welcome screen in step 404.

Figure 5I:
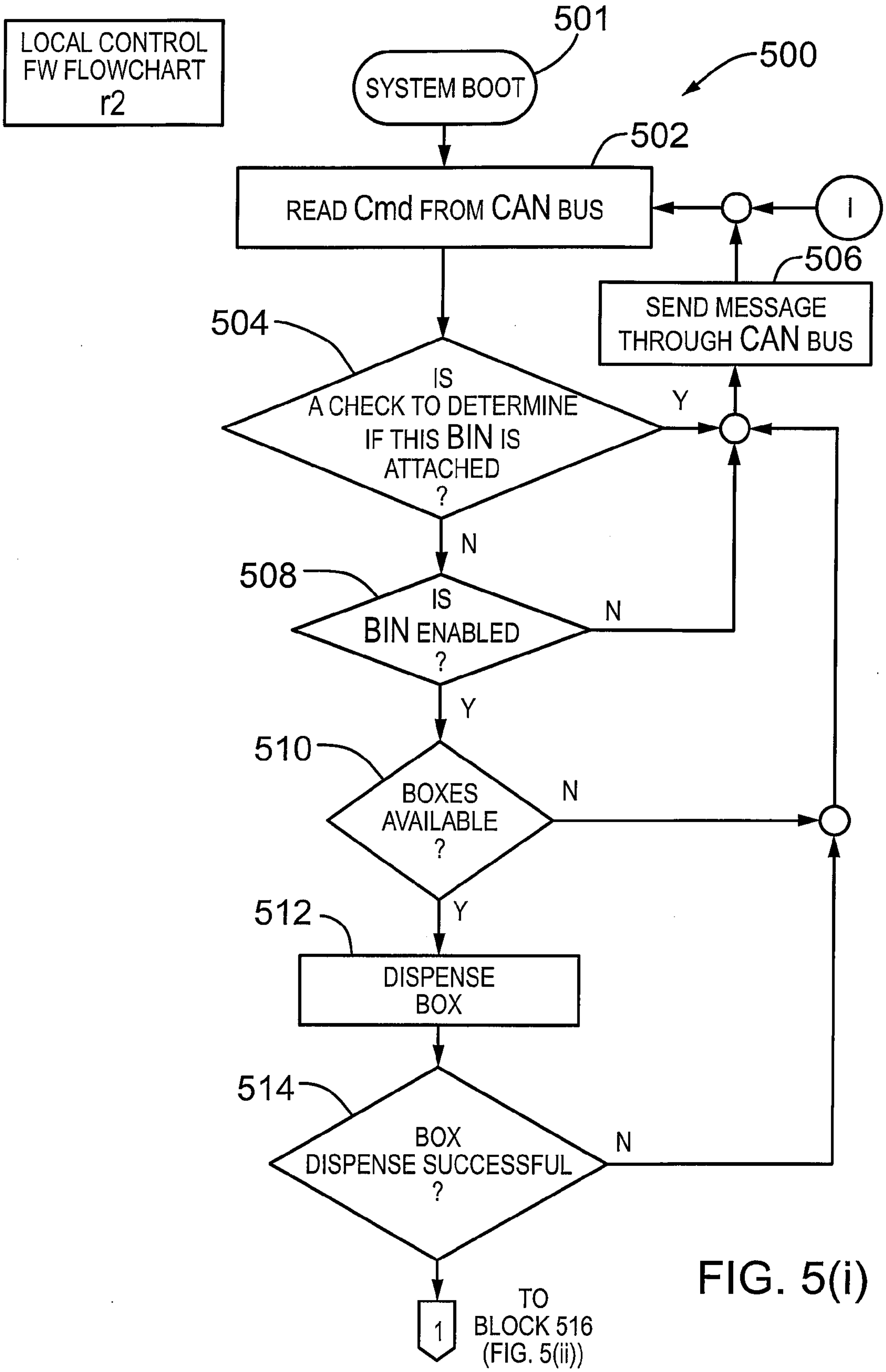
FIG. 5 shows in flowchart form an exemplary control process executed by a remote controller for the vending apparatus.
Figure 5:
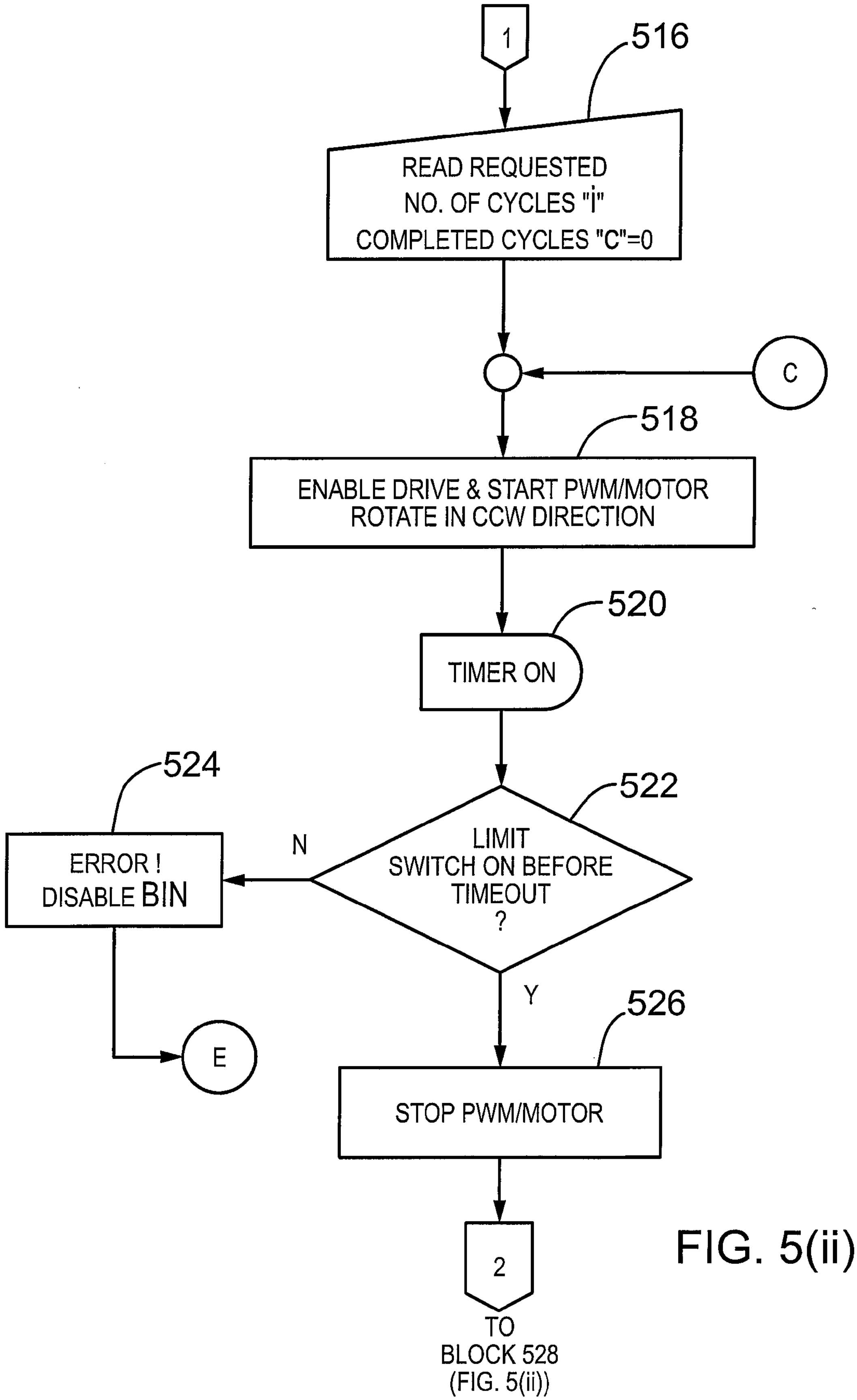

Reference is next made to FIG. 5, which shows a control process executed or performed by the control unit 150 (FIG. 1) according to an embodiment of the invention and indicated generally by reference 500. For example, the control unit 150 may be implemented as a microprocessor or microcontroller operating under stored program control, e.g. firmware or software.

As shown in FIG. 5, in response to a system boot (e.g. power on, or hard reset) in step 501, the control unit 150 reads the command from the communication bus 130 (FIG. 1) sent by the controller in the control panel 110 (FIG. 1) in step 502 and checks if the associated bin 140 (FIG. 1) is attached or connected in step 504 If the bin 140 is not attached, the control unit 150 sends a message via the communication bus 130 to the control panel 110. If the bin 140 is attached, then a check is made in step 508 to determine if the bin 140 is enabled. If the bin 140 is not enabled, then the control unit 150 sends a message to the control panel (step 506) via the communication bus 130. If the bin 140 is enabled, then the control unit 150 checks if boxes are available as indicated by step 510. If boxes are not available, then the control unit 150 sends a message to the control panel (step 506) via the communication bus 130. If boxes are available, then the control unit 150 dispenses (e.g. releases) a box in step 512 and a check may be made in step 514 to determine if the box was successfully dispensed. Next in step 516, the control unit 150 reads the number of requested cycles. According to one embodiment, the quantity of product to be dispensed is measured in terms of cycles. Next in step 518, the control unit 150 commences a dispensing cycle by enabling the driver (i.e. the motor driver 332 in FIG. 3) and starting the motor rotating, for example, in a counter clockwise direction. The control unit 150 starts a timer in step 520 which provides a time-base for the dispensing cycle. An error condition is generated in step 524 if a limit switch is not reached before the timer times out, as determined in step 522. In response to the error condition, the control unit 150 sends an error message to the control panel 110 via the communication bus 130 in step 534 and the process is terminated with an error in step 536. If the limit switch is activated before the time-out, then the control unit 150 stops the motor in step 526, and a check is made in step 528 to determine if the number of cycles completed corresponds to the number of requested cycles. If not, the number of cycles completed is incremented in step 530 and the operations associated with steps 518 to 528 as described above are repeated. If the number of completed cycles corresponds to the number of requested cycles, then the control unit 150 disables the motor driver 332 in step 530 and confirms the vending (or dispensing) operation in step 532, for example, by sending a message to the control panel 110 via the communication bus 130.

Figure 6:
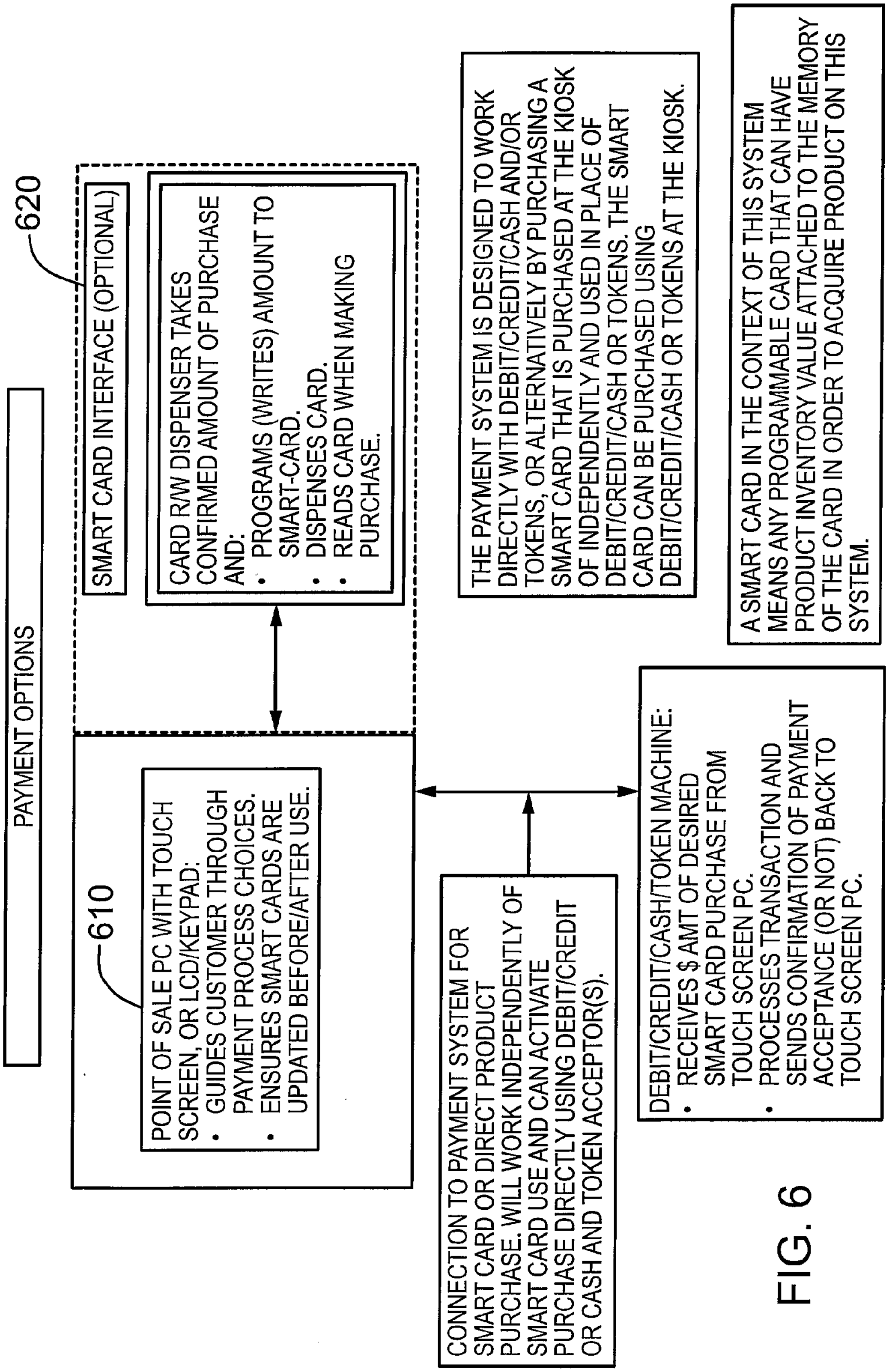
FIG. 6 shows in diagrammatic form the payment options available for the vending apparatus according to an embodiment of the invention.

Reference is next made to FIG. 6, which shows in diagrammatic form a payment system for the system 100 according to an embodiment of the invention. According to an embodiment, the payment system comprises a smart card payment interface and a direct payment interface. In the context of the present description, a smart card comprises any programmable card that has product inventory value (for example, stored in memory) for acquiring product from the system 100. Direct payment, on the other hand, comprises payment from a credit card or a debit card, or payment using cash or tokens. The tokens may be purchased from a token machine connected to the system 100 or a token machine associated with the use of the system 100. The direct payment interface may be further divided into cash mode and cashless payment mode. Cash mode utilizes cash payment in the form of coins and/or bills. Cashless mode comprises payment using credit cards, debit cards, and/or tokens.

As described above, the control panel 110 (FIG. 1) includes a display with a keypad or a touch screen, indicated by reference 610 in FIG. 6. According to this aspect, the display/keypad 610 guides a user (e.g. a customer) through payment process choices or options, for example, a smart card purchase or a direct payment purchase. For direct payment from a credit card or debit card, the user's credit card or debit card is charged prior to the vending process. For a smart card purchase, the purchase amount is taken directly from the user's smart card. The balance on the smart card is determined before the transaction and then updated after the purchase.

According to an embodiment the smart cards are purchased from a kiosk or an independent vendor with cash, credit card, debit card or tokens. According to another embodiment, the system includes an optional smart card interface indicated by reference 620 in FIG. 6. The smart card interface 620 programs or writes an inventory value amount to a smart card and dispenses the smart card to the user. The smart card 'purchase' may be charged to a user's credit card or other account. According to another aspect, the system, through the smart card reader interface 620, reads and displays the amount of credit or purchase value remaining on the card.

Figure 7:
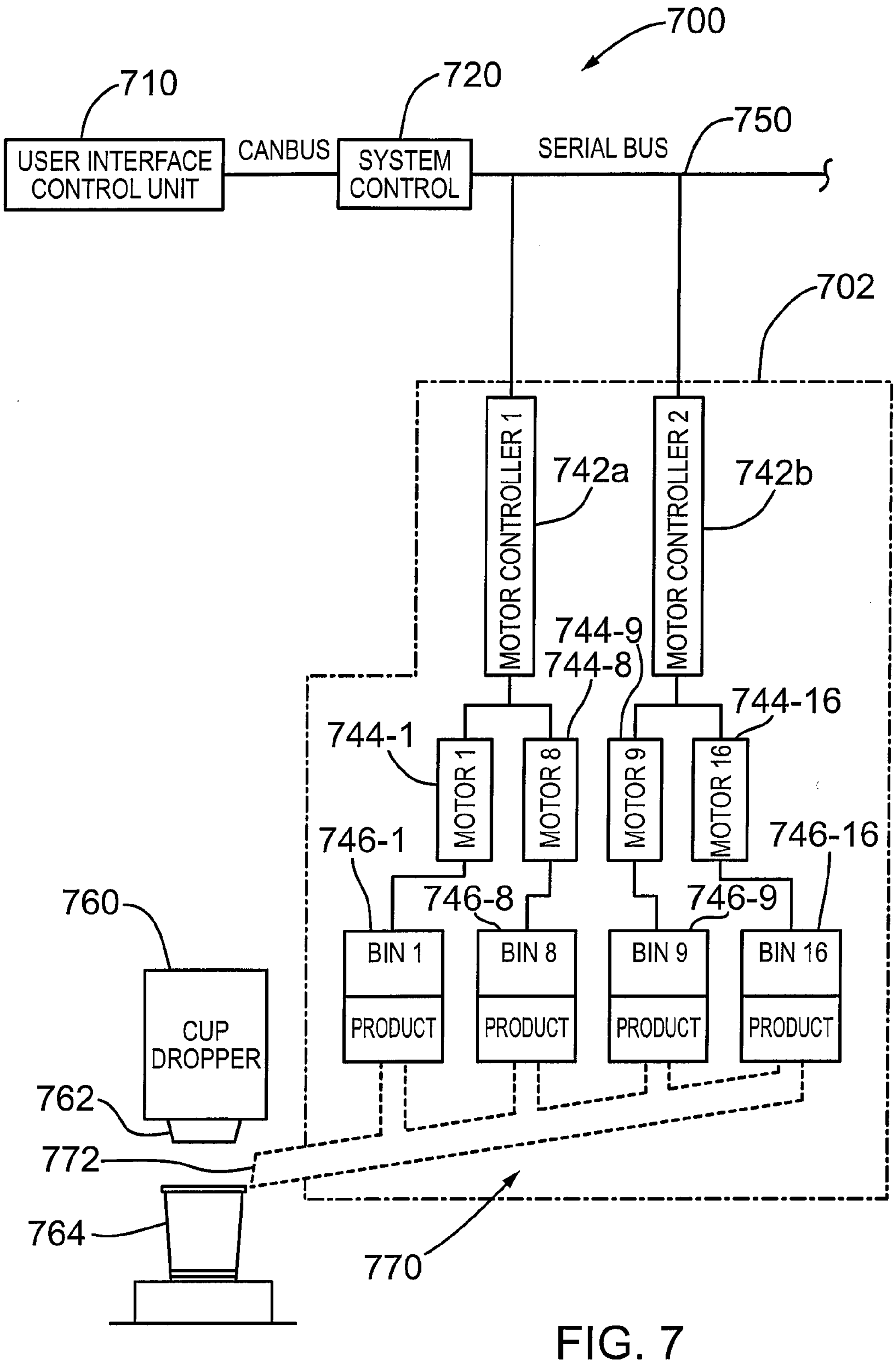
FIG. 7 shows in diagrammatic form a dispensing apparatus according to another embodiment of the present invention.

Reference is next made to FIG. 7, which shows in schematic form a dispensing apparatus according to another embodiment of the present invention and indicated generally by reference 700. According to one aspect, the dispensing apparatus 700 is intended for interfacing and/or functioning with third-party bin arrangement or configuration, as opposed to an integrated system, for example, as described above with reference to FIG. 1 according to an embodiment of the invention. For the exemplary embodiment depicted in FIG. 7, the third-party bin arrangement is indicated generally by reference 740.

As shown in FIG. 7, the dispensing apparatus 700 comprises a user interface control unit 710 and a system controller 720. The user interface control unit 710 is coupled to the system controller 720 via a control signal bus 730. According to an embodiment, the control signal bus 730 is implemented using a CANBUS configuration, for example, as described in more detail above. For the example depicted in FIG. 7, the third-party bin arrangement is indicated generally by reference 702, and comprises a first group of motors 744 (indicated individually by references 744-1 to 744-8) and bins 746 (indicated individually by references 746-1 to 746-8) and a second group of motors 744 (indicated individually by references 744-9 to 744-16) and bins 746 (indicated individually by references 746-9 to 746-16). The bins 746-1 to 746-8 and the motors 744-1 to 744-8 include an associated motor controller indicated by reference 742*a*. Similarly, the bins 746-9 to 746-16 and the motors 744-9 to 744-16 include an associated motor controller 742*b*. As shown, a bus 750 (for example, a serial bus configuration) couples each of the motor controllers 742*a* and 742*b* to the system controller 720. For the exemplary configuration depicted in FIG. 7, each of the motor controllers 742*a*, 742*b* controls eight (8) motors 744, respectively, indicated individually as 744-1 to 744-8 and 744-9 to 744-16. It will be appreciated that the number of motor controllers 742 and/or individual motors 744 can be expanded or comprise other configurations or arrangements. According to an embodiment, the motors 744 comprise servo motors, and each motor is operatively coupled to a dispensing mechanism on the bin 746 and response to control signals from the motor controller 742, the motor 744 actuates the dispensing mechanism to dispense product from the bin 746. A dispensing mechanism according to an embodiment of the invention is described in more detail below.

As also shown in FIG. 7, a container dispenser 760, i.e. a cup dropper, is provided to work with the third-party apparatus 702. A container dispenser or cup dropper according to an embodiment of the invention is described in more detail below with reference to FIGS. 9 and 10. The cup dropper 760 is operatively coupled to the system controller 720 and the system controller 720 is configured, for example, in software or firmware, to generate control signals to control the operation and functions associated with the cup dropper 760. In the context of the present description, the third-party dispensing apparatus 702 utilizes a single cup dropper 760 which is configured to provide cups or containers (indicated by reference 762 in FIG. 7) for all of the product bins 746, and is operatively coupled to the output of each of bin 746 in known manner, for example, using a chute or piping arrangement (indicated generally by reference 770 in FIG. 7) which carries product released from the bin 746 to a chute (indicated by reference 772 in FIG. 7) that releases the product into the dropped cup or container 764. A container dispenser, i.e. cup dropper, 760 according to an embodiment of the invention is described in more detail below with reference to FIGS. 9 and 10.

According to an embodiment, the user interface control unit 710 includes a programmable controller device, for example, a microprocessor or microcontroller, and is configured to operate under the control of software and/or firmware to provide the user interface functions and operability, for example, as described above.

In accordance with a CANBUS implementation for the control signal bus 730, the user interface control unit 710 is configured to generate and send a vend signal (i.e. command) to the system controller 720. The vend command comprises an identifier or ID field and a bin number field (i.e. corresponding to the selected product). The system controller 720 is configured to receive the vend command and decode the vend command to generate a signal to actuate the cup dropper 760 to drop a cup or container 762 for receiving the product. The system controller 720 is also configured to generate one or more actuation commands for controlling the functioning of the motor controller(s) 742 associated with the product or products to be dispensed. According to an embodiment, the actuation command comprises five (5) or six (6) bytes and is transmitted via the serial bus 750 to each of the motor controllers 742. The actuation command comprises the following format:

| | |
|---|---|
| first byte - | comprises a synchronization byte which is the same for all messages, and according to an implementation comprises 0x80 |

-continued

| | |
|---|---|
| second byte - | identifies the type of controller, and according to an implementation comprises 0x01 |
| third byte - | comprises a command byte which provides an operation instruction for the motor controller |
| fourth byte - | identifies the motor associated with the bin container for the selected product; and according to an embodiment is configured to select 128 motors/bins, i.e. 0 to 128 |
| fifth & sixth bytes - | contains data for the motor controller to control the selected motor; according to an embodiment, the data includes motor speed, range and position |

According to an embodiment and as described above, each of the motor controllers 742 is configured to control eight (8) motors 744 and the bin 746 associated with the respective motor 744. The motor controllers 742 are configured to receive commands from the system controller 720 via the communication bus (i.e. serial bus) 750 and generate control signals to control the operation of the associate motor 744 in the actuation of the bin 746. According to an embodiment, the control signal generated by the motor controller 742 comprises a pulse width modulated (PWM) activation signal. In response to the activation signal, the motor 744 (e.g. servo motor) opens and closes the dispensing mechanism in the bin 746. According to an embodiment, each opening and closing of the dispensing mechanism by the motor 744 comprises a dispensing cycle and result in a measure amount or volume of a product being dispensed or released from the bin 746. According to another embodiment, the motor 744 is configured under the control of the motor controller 742 to actuate the dispensing mechanism and dispense product based on a time-interval. According to another embodiment, the dispensing apparatus is configured with a measurement device and motor 744 is configured under the control of the motor controller 742 to actuate the dispensing mechanism to dispense product on the basis of weight, volume, product count, or some other measured parameter.

Figure 8:
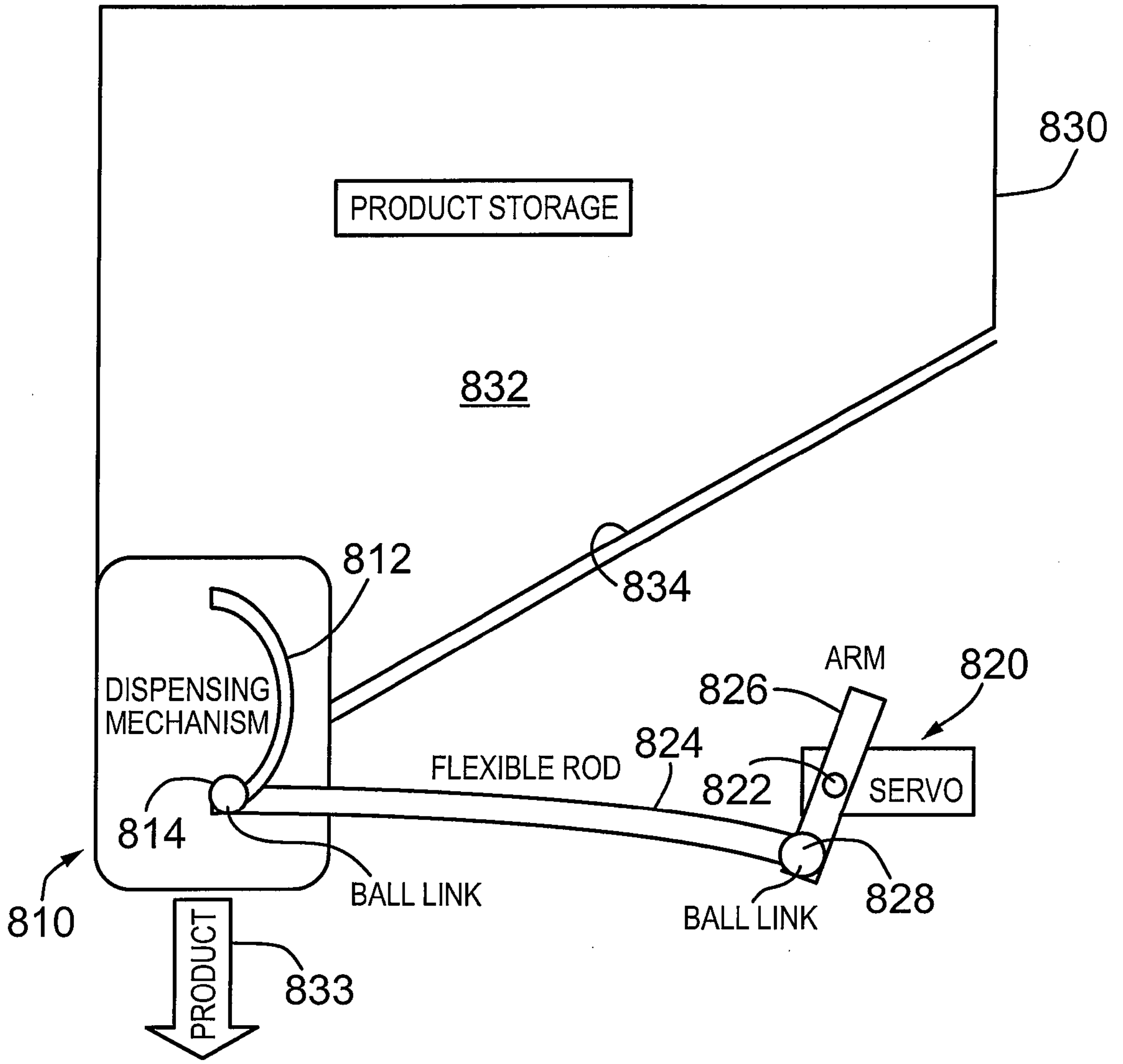
FIG. 8 shows in diagrammatic form a gravity-fed bin with a dispensing mechanism according to an embodiment of the present invention.

Reference is next made to FIG. 8, which shows a dispensing mechanism according to an embodiment of the invention. The dispensing mechanism is indicated by reference 810 and is operatively coupled to a bin indicated by reference 830. The bin 830 holds product 832 to be dispensed and is configured as a "gravity-fed" bin and comprises a sloped or angled plate or bottom 834. The dispensing mechanism 810 comprises a dispensing member 812 is coupled through a pivotable or ball link 814 to an actuator rod 824. The dispensing member 812 is movable between a closed position (as shown in FIG. 8) and an open position in response to movement of the actuator rod 824. In the closed position, the dispensing member 812 prevents product 832 from being released, i.e. dispensed, from the bin 830. In the open position, the dispensing member 812 allows product 833 to be dispensed from the bin 830. The product 833 may be released directly into a container or routed to a dispensing chute positioned away from the bin 830.

According to the embodiment depicted in FIG. 8, the actuation rod 824 is actuated by a servo motor 820 (i.e. corresponding to the motor 744 depicted in FIG. 7). As shown, the servo motor 820 includes a spindle 822 which is coupled to an arm 826, and one end of the arm 826 is coupled or connected to the other end of the actuator rod 824 through pivotable or ball link indicated by reference 828. In operation, the servo motor 820 responds to control signals (i.e. from the associated motor controller 742 in FIG. 7) to move the spindle 822 and the arm 826 between an open and a closed position. The movement of the spindle 822 is transferred to the actuator rod 824 through the link 828 and the dispensing member 812 is moved between the open and closed positions. According to another embodiment, a linear actuating device (not shown) is used in place of the servo motor 820 to move the dispensing member 812 between the open and closed positions.

Figure 9A:
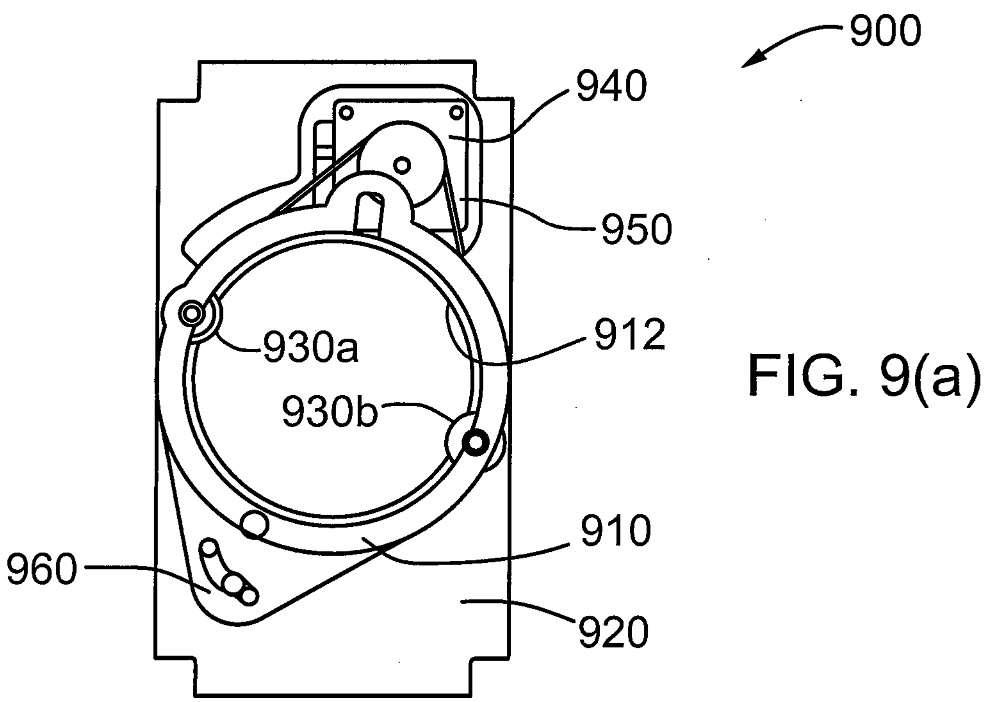
FIGS. 9(*a*) to 9(*b*) show in diagrammatic form a cup (container) dropper mechanism according to an embodiment of the present invention.
Figure 9B:
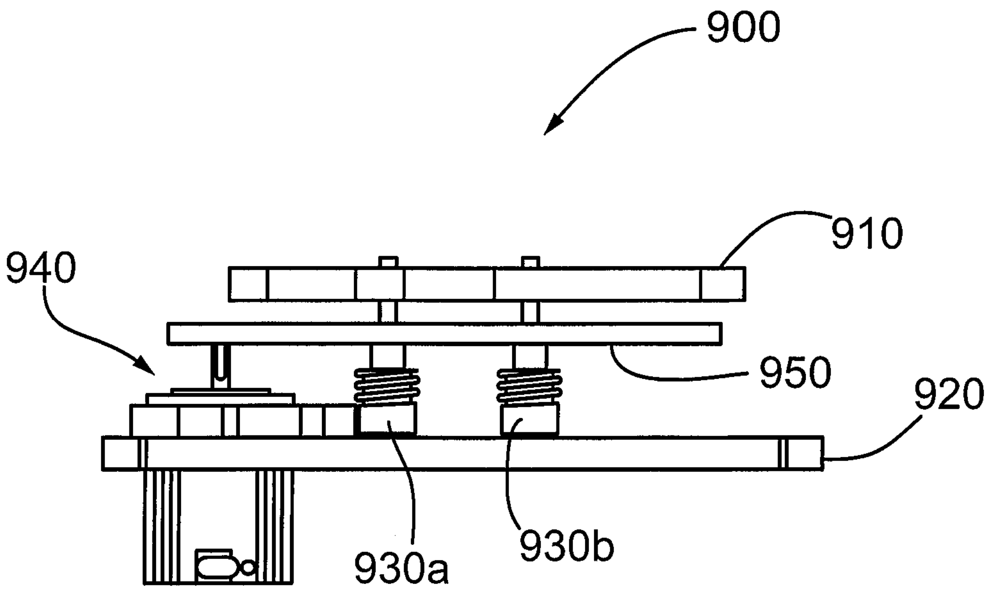
Figure 10A:
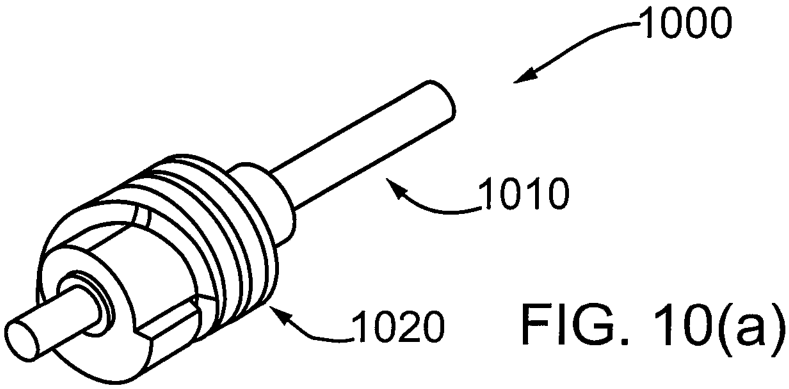
FIGS. 10(*a*) to 10(*d*) show in diagrammatic form an auger for the dropper mechanism of FIG. 9 according to an embodiment of the present invention.
Figure 10B:
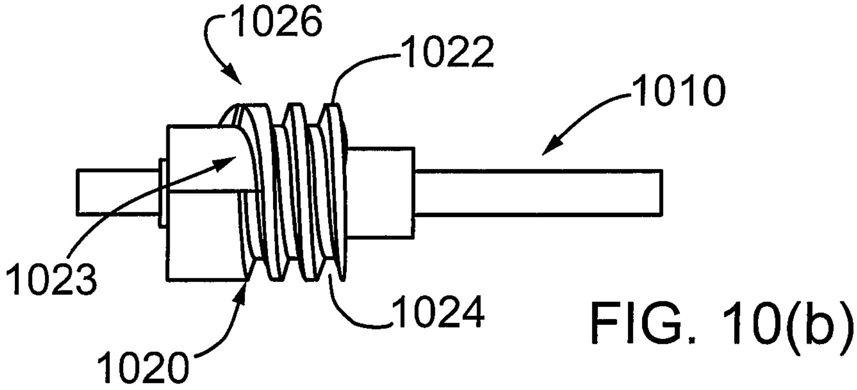
Figure 10C:
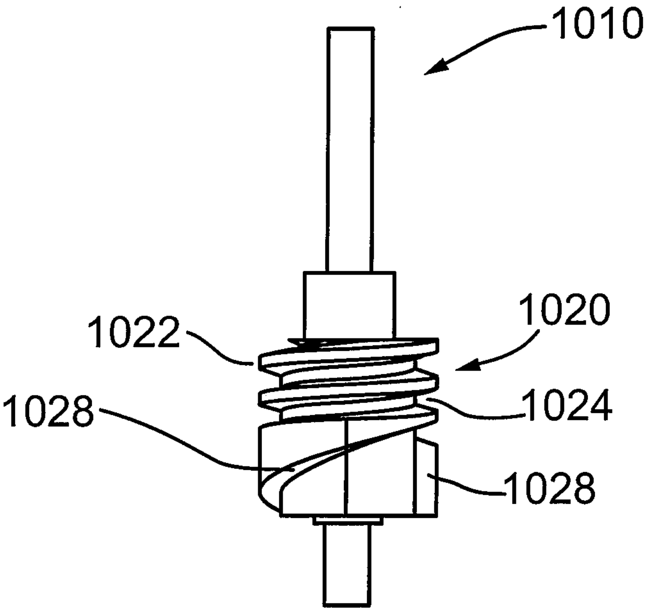
Figure 10D:
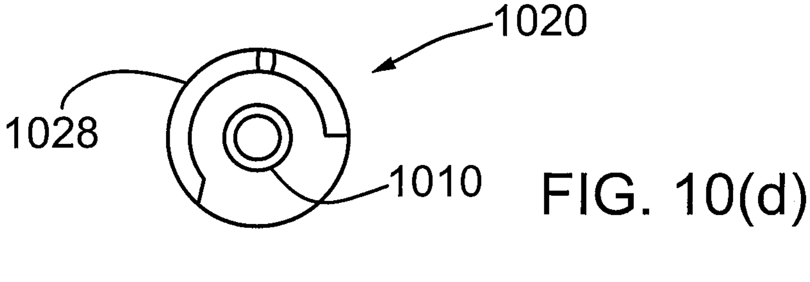
Figure 11A:
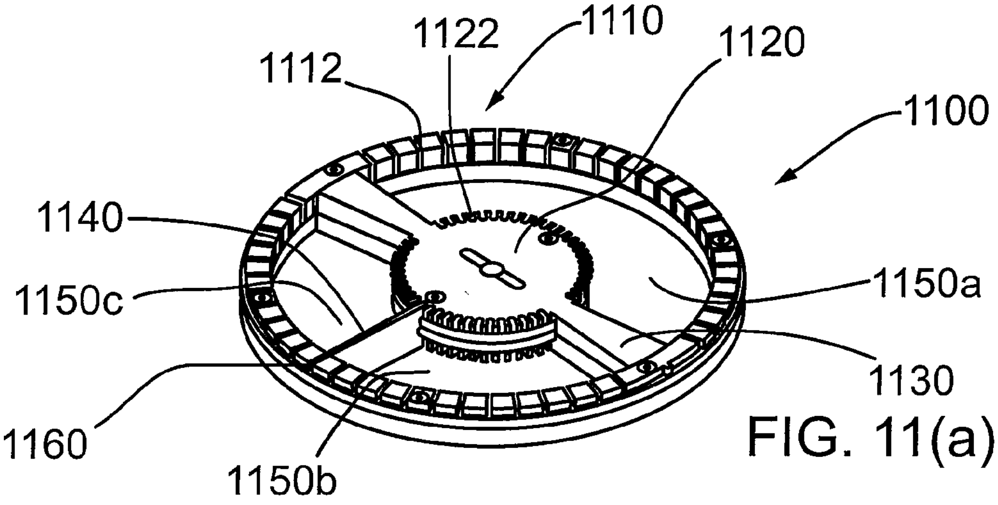
FIGS. 11(*a*) to 11(*d*) show in diagrammatic form a dispensing wheel according to an embodiment of the present invention.
Figure 11B:
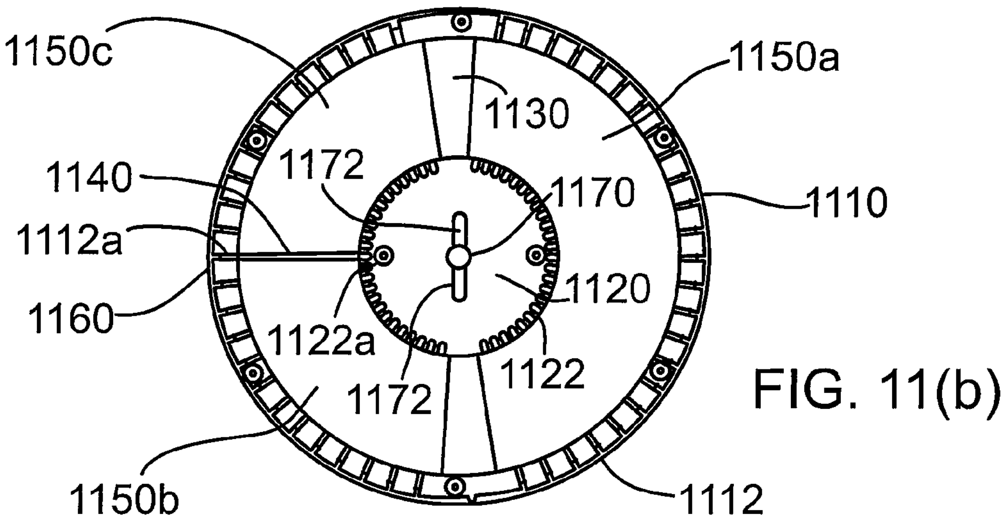
Figure 11C:
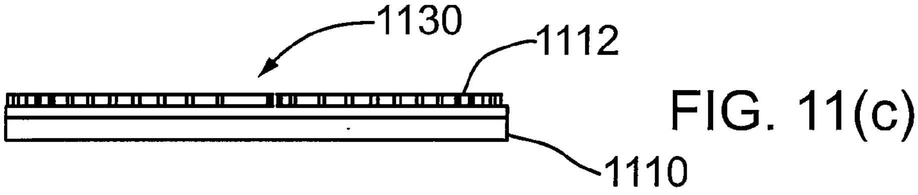
Figure 11D:
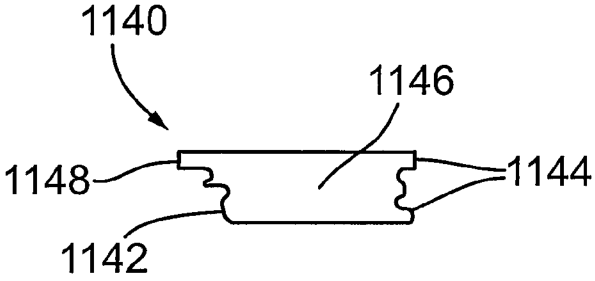

Reference is next made to FIGS. 9(*a*) and 9(*b*), which show a container or cup dropper mechanism according to an embodiment of the invention and indicated generally by reference 900. The container mechanism 900 is configured to drop containers, e.g. cups, for catching or holding product dispensed from one or more of the bins. For example, the cup dropper 760 in FIG. 7 may be implemented with the container dropper mechanism 900.

As shown in FIGS. 9(*a*) and 9(*b*), the container dropper mechanism 900 comprises a top plate or member 910, a bottom plate or member 920, first and second augers 930 (indicated individually by reference 930*a* and 930*b*), and a motor 940. The augers 930 are operatively coupled to the motor 940 by a belt 950 and are turned when the spindle of the motor 940 moves the belt 950. As shown, the container dropper mechanism 900 includes a belt tension device or mechanism 960 for controlling the tension in the belt 950.

As shown in FIG. 9(*a*), the top plate 910 includes an opening indicated by reference 912. The opening 912 receives the containers, i.e. the containers are loaded or stacked vertically into the opening 912. For round cups or containers, the opening 912 has a corresponding round shape. As shown, each of the augers 930*a* and 930*b* slightly protrude into the opening 912 of the top plate 910. An auger according to an embodiment of the present invention is described in more detail below with reference to FIGS. 10(*a*) to 10(*d*). Each of the augers 930 includes a spiral threaded portion 1020 (FIG. 10) which catches the rim of a container. According to another aspect, the auger 930 includes a thread spacing 1021 (FIGS. 10(*b*), 10(*c*)) which substantially matches the gap between the containers in the stack. The augers 930 are turned by the motor 940 and the belt 950 (for example, in response to a 'drop container' command issued by the system controller 720 (FIG. 7)), and the threaded portion 1020 of the augers 930 catches or grabs the rim of the container and feeds (or pulls) the container down through the opening 912 and the container is released once the rim passes the threaded portion.

According to an embodiment, the belt 950 comprises a 'toothed' timing belt and is synchronized to turn the augers 930. According to another embodiment, the augers 930 are turned by another type of mechanism, for example, a linear actuator. According to another embodiment, the augers 930 are manually actuated, for example, by a handle or a plunger mechanism.

Reference is next made to FIGS. 10(*a*) to 10(*d*), which show an auger 1000 according to an embodiment of the present invention. As shown, the auger 1000 comprises a spindle or shaft 1010 and a threaded portion 1020. The threaded portion 1020 comprises a spiral thread 1022. The spiral thread 1022 has a spacing or pitch 1024 which is based on the thickness or size of the rim on the containers. As the augers 1000 are rotated (for example, as described above with reference to FIG. 9), the container at the bottom of the stack reaches the bottom or end of the spiral thread 1022, as indicated by reference 1023 in FIG. 10(*b*), and the rim is no longer engaged thereby allowing the container to fall from the dispenser.

According to another aspect, the bottom or final thread 1026 on the auger 1000 is configured with an increased curvature or slope indicated by reference 1028. The increased curvature or slope 1028 functions to overcome the attractive force between the bottom container and the other containers in the stack. In operation, as the auger 1000 is turned, the increased curve '028 along the bottom edge of the bottom or final thread 1026 functions as a wedge between the bottom container and the second-last container which is still restricted or engaged by the spiral thread 1022 in the auger 1000.

According to an embodiment, one container is dispensed or released for each rotation of the augers 1000. According to another embodiment, a sensor may be configured to provide an output signal to the motor controller indicating a complete rotation of the auger 1000. According to another aspect, the length of the treaded portion 1020 may be adjusted to vary the number of cups or containers that are engaged by the augers 930.

Figure 12A:
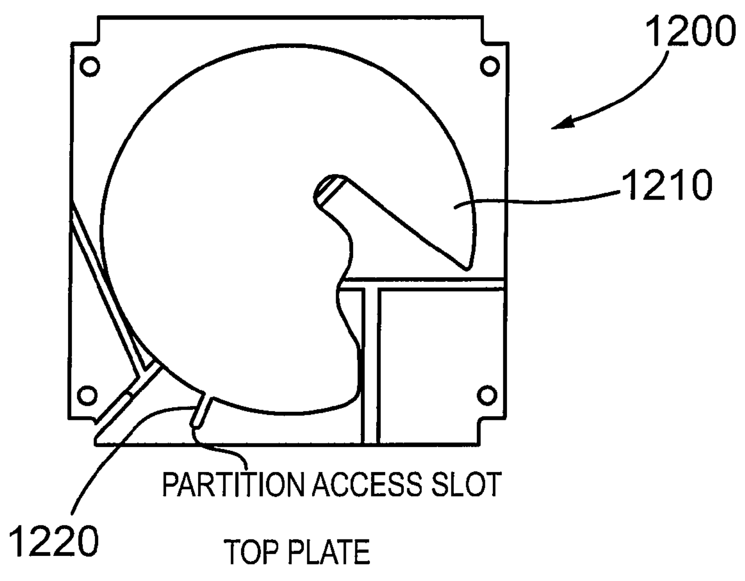
FIGS. 12(*a*) to 12(*b*) show a top plate and a bottom plate arrangement for the dispensing wheel of FIG. 11 according to an embodiment of the present invention.
Figure 12B:
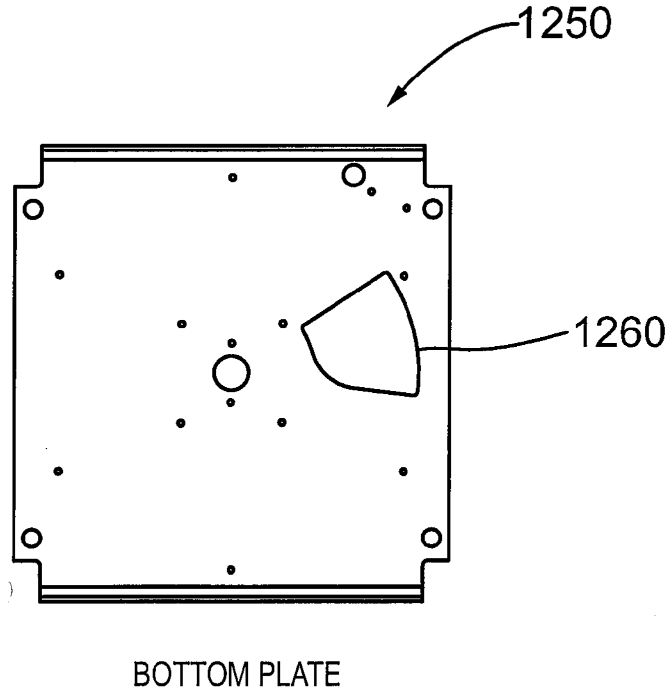

Reference is next made to FIGS. 11 and 12, which show a dispensing wheel according to an embodiment of the invention and indicated generally by reference 1100. The dispensing wheel 1100 is configured to rotate and dispense product carried in one or more compartments in the wheel 1100. According to an embodiment, the compartments in the dispensing wheel 1100 are configurable. The dispensing wheel 1100 may be used in conjunction with a bin configuration, for example, as described below with reference to FIG. 13.

As shown in FIG. 11, the dispensing wheel 1100 comprises an outer or outside rim 1110 and a hub 1120. The rim 1110 is connected or coupled to the hub 1120 by a pair of members indicated generally by reference 1130. The dispensing wheel 1100 is configurable into multiple compartments with the use of one or more partitions 1140. As shown in FIG. 11 (*a*), the dispensing wheel 110 is configured with three compartments, indicated by references 1150*a*, 1150*b* and 1150*c*, respectively. By removing the partition 1140, the dispensing wheel 110 is configured with two partitions. Or with the addition of two or more partitions 1140, the dispensing wheel 1100 is configured with multiple compartments.

The dispensing wheel 1100 is mounted on a shaft 1170 (FIG. 11(*b*)) and positioned between a top plate 1200 (as shown in FIG. 12(*a*)) and a bottom plate 1250 (as shown in FIG. 12(*b*)). The shaft 1170 includes one or two keys 1172, which lock the dispensing wheel 1100 on the shaft 1170 and allow the rotational force applied to the shaft 1170 to be transferred to the dispensing wheel 1100. The rotational force for the shaft 1170 is generated by a motor (not shown) which can be controlled in a manner as described above. As shown in FIG. 12(*a*), the top plate 1200 includes an opening 1210 which generally corresponds to the dispensing wheel 1100. The top plate 1200 allows product to be fed into the compartment(s) on the dispensing wheel 1100, typically through the force of gravity (for example, as described in more detail below with reference to FIG. 13). When a compartment is filled, the product stops flowing into the compartment, and as the dispensing wheel 1100 turns product from the bin enters the other compartments 1150. The top plate 1200 also includes a partition access slot 1220. The partition access slot 1220 allows one or more partitions or dividers 1140 (FIG. 11(*b*)) to be inserted into the dispensing wheel 110 to define or configure multiple compartments 1150 (FIG. 11(*a*)). As shown in FIG. 12(*b*), the bottom plate 1250 includes an opening 1260, which is configured to allow product captured in or more compartments 1150 in the dispensing wheel 110 to be released or dispensed directly into a container or onto a chute coupled to a container or some other form of product handling device or mechanism.

As shown in FIGS. 11(*a*) and 11(*b*), the outer rim 1110 and the hub 1120 are configured with corresponding slots or grooves indicated by references 1112 and 1122, respectively. As shown in FIG. 11(*d*), each of the partitions 1140 comprises a rim engaging end 1142, a hub engaging end 1144, and a divider section 1146. The rim engaging end 1142 is configured to lock or snap-fit into one of the slots 1112 on the rim 1110. Similarly, the hub engaging end 1144 is configured to lock or snap-fit into one of the slots 1122 on the hub 1120. For example and as depicted in FIG. 11(*b*), the partition 1140 is inserted into rim slot 1112*a* and hub slot 1122*a* to form the compartments 1150*b* and 1150*c*. The partitions 1140 are further secured in place by the close proximity of the top plate 1200 (FIG. 12(*a*)) and the bottom plate 1250 (FIG. 12(*b*)). As described above, the partition access slot 1220 in the top plate 1200 (FIG. 12(*a*)) allows for the insertion and removal of individual partitions 1140 from the dispensing wheel 1100.

Referring again to FIG. 11(*d*), the partition 1140 may include according to an embodiment a tab indicated by reference 1148. The tab 1148 extends through the slot 1112 in the outer rim 1110 as indicated by reference 1160 in FIGS. 11(*a*) and 11(*b*). The tab 1148 is configured to actuate a limit switch (not shown) coupled to the system controller 720 (FIG. 7) and thereby provide a signal indicating the position of the dispensing wheel 1100, which may be used to control the stopping of the motor/dispensing wheel 1100 for each dispensed portion of product.

Figure 13A:
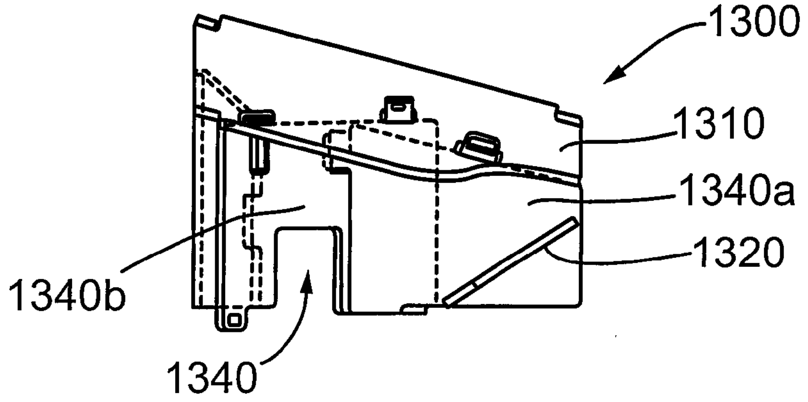
FIGS. 13(*a*) to 13(*c*) show in diagrammatic form a baffle mechanism for a bin according to an embodiment of the present invention.
Figure 13B:
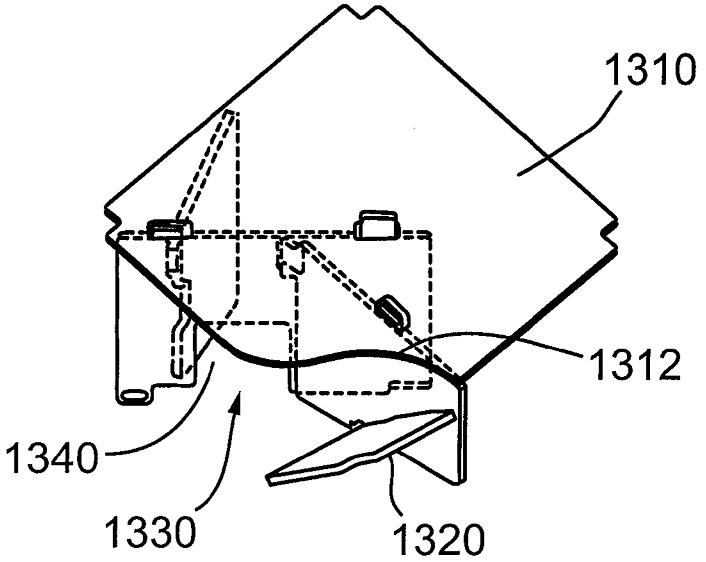
Figure 13C:
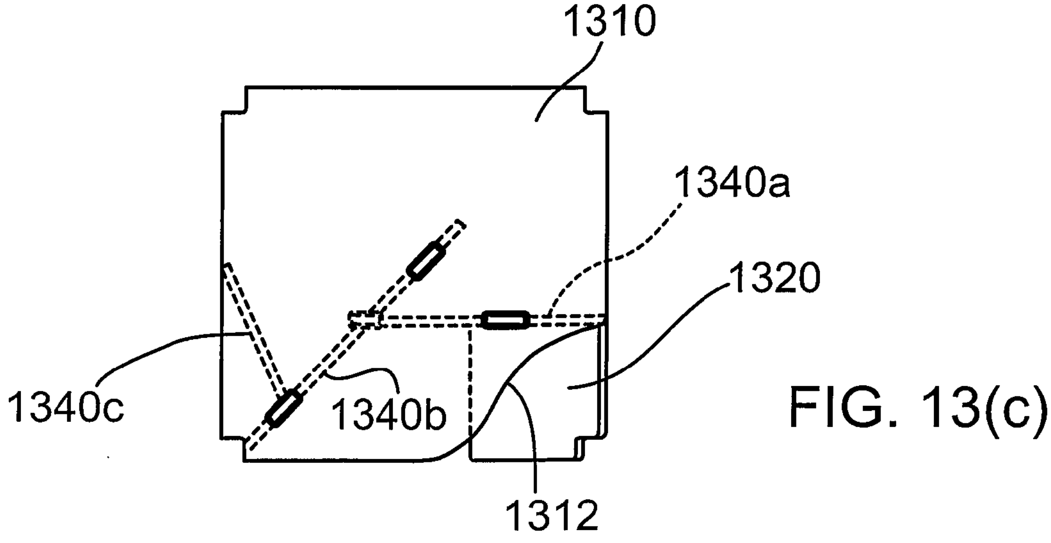

Reference is next made to FIGS. 13(*a*) to 13(*c*), which show a baffle configuration for a product bin according to an embodiment of the present invention. The baffle configuration is indicated generally by reference 1300 and comprises a primary baffle 1310 and a secondary baffle 1320. The embodiment depicted in FIG. 13 is configured for a rectangular bin that holds a bulk product. The primary baffle 1310 holds most of the weight of the bulk product contained in the bin and is held in place by cross-members or support members 1340*a*, 1340*b* and 1340*c*. As the primary baffle 1310 holds most of the bulk product, excessive weighting of the dispensing wheel 1100 (and the resultant friction which can impede or jam/prevent the turning of the wheel) is alleviated. The cross-members 1340 also serve to transfer weight of the bulk product from the primary baffle 1310 to the bin structure.

As shown in FIG. 13(*b*), the arrangement of the primary baffle 1310, the secondary baffle 1320 and the cross-members 1340*a* and 1340*b* form a compartment or chamber 1330 for receiving bulk product from the main compartment of the bin. As shown in FIGS. 13(*b*) and 13(*c*), the primary baffle 1310 includes a cut-out or opening indicated by reference 1312. The cut-out 1312 is sufficiently large enough so that product can freely flow down the slope of the primary baffle 1310 and the secondary baffle 1320 and fall into the chamber 1330. As also shown in FIG. 13(*b*), the compartment 1330 includes an opening 1340 which allows product to be released to a dispensing mechanism. According to an embodiment, the baffle configuration 1300 is configured with a dispensing wheel 1100 as described above (FIG. 11), and the opening 1340 is aligned with the opening 1210 in the top plate 1200 (FIG. 12).

According to an embodiment, the primary baffle 1310 is configured at an angle of approximately 15 degrees, and the secondary baffle 1320 is configured at an angle of approximately 24 degrees. The slope of the secondary baffle 1320 directs the product toward the opening 1340 (i.e. dispensing wheel) so that the product does not get stuck on the bottom surface or ledge in the compartment 1330. According to another aspect, a sweep (for example, vertically mounted springs) may be provided above the dispensing mechanism to prevent the collection of excessive product.

According to another aspect, the primary baffle 1310, the secondary baffle 1320 and/or cross-members 1340 are configured to be detachable and/or removable to facilitate dismantling and/or cleaning.

While embodiments of the present invention are described in the context of dispensing and/or vending bulk candy products (e.g. unwrapped candy, wrapped candy, mini-chocolate bars, etc.), it is to be appreciated that the apparatus and methods according to the present invention comprise the dispensing and/or vending of other types bulk products, including, pet food, coffee, pasta, nuts, fasteners, such as bolts, nuts, screws, electrical connectors, nails, hardware items, such as washers, etc, toy balls, toy cars, etc. In accordance with an embodiment, the apparatus and methods according to the present invention are suitable for dispensing and/or vending bulk goods having an individual piece sizes ranging from approximately 0.1 cubic inch to approximately 12 cubic inches. According to one embodiment, bulk products are purchased, dispensed or otherwise acquired based on weight. According to another embodiment, bulk products are purchased, dispensed or otherwise acquired based on volume. According to another aspect, the price point for purchases of a bulk product is set according to the quantity or volume being purchased. For example, machine screws can be priced at $0.20/screw for quantities of 1 to 10, and priced at $0.18/screw for quantities of 11 to 20.

The present invention may be embodied in other specific forms without departing from the spirit or essential characteristics thereof. Certain adaptations and modifications will be obvious to those skilled in the art. Therefore, the presently discussed embodiments are considered to be illustrative and not restrictive.

What is claimed is:

1. An apparatus for dispensing one or more bulk products in response to inputs from a user for selecting one of the bulk products and a desired quantity, said apparatus comprising:

a communication bus;

one or more bin units, each of said bin units comprising a bin and an integrated dispensing mechanism, and further including a dedicated control unit, said bin comprising a sealable housing and being configured to hold one of the bulk products, said control unit including an addressable communication interface coupled to said communication bus, and said control unit being operatively coupled to said dispensing mechanism and configured to control said dispensing mechanism in response to one or more control commands addressed to said control unit and received over said communication bus;

a controller configured to receive the inputs from the user and generate one or more control commands for dispensing the selected bulk product in the desired quantity, and said controller including a control/command interface for addressing said bin unit associated with the selected bulk product and transmitting said one or more generated control commands to said bin unit over said communication bus;

said communication bus comprising a modular configuration for coupling a plurality of said bin units; and each of said dispensing mechanisms comprising a motor and a dispensing device, said dispensing device being operatively coupled to said motor and actuated by said motor, and said motor being operatively connected to said control unit and configured to be responsive to one or more control signals from said control unit to actuate said dispensing device, and said one or more control signals being generated based on said one or more control commands addressed to said control unit;

said dispensing mechanism comprising a chute for dispensing the desired quantity of the selected bulk product contained in said bin into a container.

2. The apparatus as claimed in claim 1, wherein said control commands comprise an identification field configured to store an address for the associated bin unit or an address for the controller.

3. The apparatus as claimed in claim 2, wherein said control commands comprise an inquiry command, a vending process start command, a vending process stop command, and a vending process error stop command.

4. The apparatus as claimed in claim 3, wherein said control unit is configured to respond to said inquiry command, and said response comprises storing said address for said controller in said identification field and transmitting said inquiry command over said communication bus to said controller.

5. The apparatus as claimed in claim 3, wherein said vending process start command includes a bin identification field and said bin identification field is configured to store a value corresponding to said bin unit containing the bulk product selected by the user.

6. The apparatus as claimed in claim 3, wherein said control unit is configured to generate said vending process error stop command when an error condition occurs, and the identification field of said vending process error stop command stores the address for the controller and is transmitted over said communication bus.

7. The apparatus for dispensing as claimed in claim 1, wherein said dispensing mechanism further includes a load cell, said load cell being operatively coupled to said control unit and configured to measure the quantity of selected bulk product being dispensed.

8. The apparatus for dispensing as claimed in claim 1, wherein said dispensing mechanism further includes an agitation mechanism responsive to said control unit and configured to agitate the bulk product in the bin so as to keep the bulk product from sticking.

9. A method for dispensing bulk products from one or more bins, each of the bins including a dispensing mechanism and a control unit operatively coupled to the dispensing mechanism and the control unit further including a control command communication interface for receiving control commands addressed to the bin, said method comprising the steps of:

receiving a bulk product selection from a user;

receiving a bulk product dispensing amount from the user;

generating a vending process control command comprising an identification field storing an address corresponding to the bin holding the selected bulk product and a bulk product amount field storing a value corresponding to the selected bulk product dispensing amount;

transmitting said vending process control command over a communication network;

receiving said vending process control command at the communication interface;

inputting said vending process control command if said identification field matches the address of the bin;

activating a motor drive integrated with the bin;

monitoring a load cell for measuring the selected bulk product being dispensed and controlling said integrated motor drive to dispense the selected bulk product from the bin in the amount specified in said bulk product amount field.

10. The method as claimed in claim 9, further including the step of generating a vending process error command and transmitting said vending process error command to a central controller in response to an error condition.

11. The method as claimed in claim 10, further including the step of suspending operation of the bin unit originating said vending process error command.

12. The method as claimed in claim 9, wherein the value stored in said bulk product amount field corresponds to a dollar value specified by the user.

13. The method as claimed in claim 9, wherein the value stored in said bulk product amount field corresponds to a bulk product quantity specified by the user.

14. The method as claimed in claim 9, further including the step of agitating at least a portion of the selected bulk product to prevent sticking or clumping of the selected bulk product during dispensing.

15. A modular bin unit for use with an apparatus for vending a bulk product, said modular bin unit comprising:

a bin comprising a sealable enclosure and being configured to hold a quantity of the bulk product;

an integrated dispensing mechanism and said integrated dispensing mechanism comprising a motor and a dispensing device, said dispensing device being operatively coupled to said motor and actuated by said motor, and said motor being operatively connected to said control unit and configured to be responsive to one or more control signals from said control unit to actuate said dispensing device;

a control unit including an addressable communication interface for coupling to a communication bus; and said control unit being operatively coupled to said dispensing mechanism and configured to generate said one or more control signals for controlling said dispensing mechanism in response to one or more control commands addressed to said control unit and received over said communication bus.

16. The modular bin as claimed in claim 15, wherein said control commands comprise an identification field configured to store an address for identifying the associated modular bin unit.

17. The modular bin as claimed in claim 16, wherein said control commands comprise an inquiry command, a vending process start command, a vending process stop command, and a vending process error stop command.

18. The modular bin as claimed in claim 17, wherein said control unit is configured to respond to said inquiry command, and said response comprises storing an address for a central controller in said identification field and transmitting said inquiry command over said communication bus to said central controller.

19. The modular bin as claimed in claim 17, wherein said vending process start command includes a bin identification field and said bin identification field is configured to store a value corresponding to the modular bin unit containing the bulk product selected by the user.

20. The modular bin as claimed in claim 17, wherein said control unit is configured to generate said vending process error stop command when an error condition occurs, and the identification field of said vending process error stop command stores an address for the central controller and is transmitted over said communication bus.

21. The modular bin unit as claimed in claim 15, wherein said dispensing mechanism further includes a load cell, said load cell being operatively coupled to said control unit and configured to measure the quantity of selected bulk product being dispensed.

22. The modular bin unit as claimed in claim 15, wherein said dispensing mechanism further includes an agitation mechanism responsive to said control unit and configured to agitate the bulk product in the bin so as to keep the bulk product from sticking.

* * * * *